(12) United States Patent
Kosuge et al.

(10) Patent No.: US 8,682,482 B2
(45) Date of Patent: Mar. 25, 2014

(54) WORKING SUPPORT ROBOT SYSTEM

(75) Inventors: Kazuhiro Kosuge, Miyagi (JP); Yusuke Sugahara, Miyagi (JP); Jun Kinugawa, Miyagi (JP); Yuta Kawaai, Miyagi (JP); Akiyoshi Ito, Kanagawa (JP); Yoichi Matsui, Kanagawa (JP); Shinji Kawabe, Kanagawa (JP)

(73) Assignees: Toyota Motor East Japan, Inc., Miyagi (JP); Tohoku University, Miyagi (JP)

( * ) Notice: Subject to any disclaimer, the term of this patent is extended or adjusted under 35 U.S.C. 154(b) by 448 days.

(21) Appl. No.: 12/922,680

(22) PCT Filed: May 21, 2010

(86) PCT No.: PCT/JP2010/058648
§ 371 (c)(1),
(2), (4) Date: Sep. 14, 2010

(87) PCT Pub. No.: WO2010/134603
PCT Pub. Date: Nov. 25, 2010

(65) Prior Publication Data
US 2011/0184555 A1    Jul. 28, 2011

(30) Foreign Application Priority Data

May 22, 2009  (JP) ................................. 2009-124756
Mar. 12, 2010  (JP) ................................. 2010-056786

(51) Int. Cl.
*G06F 7/00*        (2006.01)
*G06F 19/00*       (2011.01)
*G05B 15/00*       (2006.01)
*G05B 11/01*       (2006.01)
*G05B 19/18*       (2006.01)

(52) U.S. Cl.
USPC ............... 700/228; 700/258; 700/11; 700/23; 700/245; 700/253; 700/255; 901/9; 901/1; 901/47

(58) Field of Classification Search
None
See application file for complete search history.

(56) References Cited

U.S. PATENT DOCUMENTS 7,221,983 B2 * 5/2007 Watanabe et al. ................ 700/11
2006/0167587 A1 * 7/2006 Read ............................. 700/245
(Continued)

FOREIGN PATENT DOCUMENTS

JP    2001-341086 A    12/2001
JP    2002-066978 A     3/2002
(Continued)

OTHER PUBLICATIONS

Clark et al., "Distance to Nearest Neighbor as a Measure of Spatial Relationships in Populations", Ecology, Oct. 1954, vol. 35, No. 4, pp. 445-453 Mentioned on pp. 2-3 and 13 as-filed specification.

(Continued)

*Primary Examiner* — Yolanda Jones
(74) *Attorney, Agent, or Firm* — Chen Yoshimura LLP

(57) ABSTRACT

The working support robot system of the present invention includes: a robot arm (11); a measuring unit (12) for measuring the worker's position; a work progress estimation unit (13) for estimating the work progress based on data input from the measuring unit (12) while referring to data on work procedure, and for selecting objects necessary for the next task when the work is found to have advanced to the next procedure; and an arm motion planning unit (14) for planning the trajectory of the robot arm (11) to control the robot arm (11) based on the work progress estimated by the work progress estimation unit (13) and selected objects. The working support robot system can deliver objects such as tools and parts to the worker according to the work to be performed by the worker.

13 Claims, 13 Drawing Sheets

(56) References Cited

U.S. PATENT DOCUMENTS

2009/0171505 A1\* 7/2009 Okazaki .................. 700/258
2009/0210090 A1\* 8/2009 Takemitsu et al. ............ 700/245
2011/0264266 A1\* 10/2011 Kock ........................... 700/253

FOREIGN PATENT DOCUMENTS

| JP | 2004-017256 A | 1/2004 |
| JP | 2006-318166 A | 11/2006 |
| JP | 2007-283450 A | 11/2007 |
| JP | 2008-33544 A | 2/2008 |
| JP | 2008-264899 A | 11/2008 |
| JP | 2008-302496 A | 12/2008 |

OTHER PUBLICATIONS

Kinugawa et al., "Seisan Genba ni Okeru Ningen Kyocho Kyozongata Sagyo Shien Partner Robot -PaDY- the 1st. report Shisakuki no Sekkei Kaihatsu, Human-Friendly/Cooperative working support Robot -PaDY- for the Production Site, 1st. Report: the Design and Development of the Prototype", Robotics & Mechatronics Conference 2009 Koen Ronbunshu, May 24-26, 2009, 1A2-E03(1)-1A2-E03(2).

Kinugawa et al., "Seisan Genba ni Okeru Ningen Kyocho Kyozongata Sagyo Shien Partner Robot -PaDY- the 2nd. report LRF o Mochiita Sagyosha no Kodo Hanbetsu, Human-Friendly/Cooperative working support Robot -PaDY- for the Production Site, 2nd. Report: Human Motion Classification using Laser Range Finders", Robotics & Mechatronics Conference 2009 Koen Ronbunshu, May 24-26, 2009, 1A2-E04(1)-1A2-E04(2).

Kinugawa et al., "Seisan Genba ni Okeru Ningen Kyocho Kyozongata Sagyo Shien Partner Robot -PaDY- the 3rd. report Robot Arm no Kido Seisei no Tameno Sagyosha no Kodo Keisoku to Sono Kosatsu, Human-Friendly/Cooperative working support Robot -PaDY- for the Production Site, 3rd. Report: Motion Mesurement of Worker for Trajectory Generation of Robot Arm", Dai 27 Kai The Robotics Society of Japan Gakujutsu Koen Gaiyoshu, Sep. 15, 2009, RSJ2009AC3C3-02.

Kinugawa et al., "Seisan Genba ni Okeru Ningen Kyocho Kyozongata Sagyo Shien Partner Robot -PaDY- the 4th. report Tokei Data ni Motozuku Sagyo Shindo no Suitei Hoho, PaDY: Human-Friendly/Cooperative Working Support Robot for Production Site, 4th. Report: Estimation Method of Work Gait Based on Statistic Data", 15th. Robotics Symposia Yokoshu, Mar. 15, 2010, pp. 176 to 183.

International Search Report (ISR) issued in PCT/JP2010/058648 mailed in Jun. 2010 for Examiner consideration.

Written Opinion (PCT/ISA/237) issued in PCT/JP2010/058648 mailed in Jun. 2010.

\* cited by examiner

WORKING SUPPORT ROBOT SYSTEM

TECHNICAL FIELD

The present invention relates to a working support robot system that delivers necessary parts, tools, and so on to a worker according to work progress.

BACKGROUND ART

Much of the work in an automobile assembly line is still being done by men, because there are a number of parts that cannot be handled by a robot, it is necessary to respond flexibly to frequent process switching, and for various other reasons.

In a small parts assembly process, a transportation means for transferring automobile bodies is equipped with a parts trolley. The parts trolley moves in sync with the movement of an automobile body, and relatively small parts and tools are placed on the workbench of the parts trolley. Workers perform a series of procedure as described below. As the first procedure, the worker takes out parts placed on the workbench, moves to the parts mounting position, mounts the parts to the automobile body, and returns to the position of the parts trolley. As the second procedure, the worker takes out other parts and a tool from the workbench, moves again to the mounting position of the parts, mounts the parts to the automobile body using that tool, and again returns to the position of the parts trolley. As the third procedure, the worker takes out yet another tool, moves to the position where refastening is to be performed, performs fastening work, and moves back to the position of the parts trolley. As the fourth procedure, the worker pushes the parts trolley back to the original position, namely the initial position. In the assembly line where a series of procedure described above is performed, no parts shelves are provided to reduce the walking distance of workers. In another example of automobile assembly lines, robots are installed in specified positions instead of workers to promote automation of the assembly line.

Research and development on robots capable of working together with human workers has been performed (Patent Literatures 1 to 5). The robot arm control technique disclosed in Patent Literature 1 allows even a multiple-joint robot arm to contact workers safely. The optimum contact motion corresponding to the movement of workers does not cause contact damage to workers. With the technique disclosed in Patent Literature 2, the minimum output necessary for a robot to perform a specified work is obtained, and by controlling the output exceeding that limit, co-existence and cooperation between the robot and the worker are ensured. With the technique disclosed in Patent Literature 3, the movable range of a robot and a worker off-limit area are established accurately and in simple procedure, and the movable range and the off-limit range can be modified as required. The technique disclosed in Patent Literature 4 prevents the robot from entering into a prohibited area unexpectedly due to a human error that may occur during cooperative work of the worker and the robot, while ensuring that the movement of the robot is not controlled carelessly. With the technique disclosed in Patent Literature 5, a robot, working with humans and having a joint portion, that may contact the worker during motion, is provided with a contact sensor. Receiving a detection signal from the contact sensor, the control means controls the drive unit to perform risk aversion operation, thus preventing harm to workers.

In addition to techniques described above, with the transfer robot system disclosed in Patent Literature 6, a robot arm is mounted to an unmanned carrier, which is transferred between facilities, with the robot arm made to perform necessary work.

CITATION LIST

Patent Literature

Patent Literature 1: JP2008-302496A
Patent Literature 2: JP2008-264899A
Patent Literature 3: JP2007-283450A
Patent Literature 4: JP2004-017256A
Patent Literature 5: JP2002-066978A
Patent Literature 6: JP2001-341086A

Non Patent Literature

Non Patent Literature 1: P. J. Clark et al, Ecology, Vol. 35, No. 4, pp. 445-453, October 1954

SUMMARY OF THE INVENTION

Technical Problem

Even if the parts trolley moves in sync with the movement of the automobile body, if the worker lags in his/her work, the parts trolley must remain in standby state. On the other hand, if the worker gets ahead of time procedure, he/she must remain in standby state. The efficiency of the entire line could thus be decreased even if the movement of the parts trolley and the automobile body are synchronized. In addition, the worker must move between the parts trolley and the working place repeatedly to take out parts and tools from the parts trolley and perform intended work, which is inefficient.

Meanwhile, Patent Literature 6 only explains that the robot is made to transfer along the traveling path installed along multiple facilities, and that the robot arm is made to perform various tasks such as delivery of work and assembly, in a state in which the robot remains at a specified work position in front of the facilities.

A purpose of the present invention is to provide a working support robot system capable of delivering parts and tools necessary for task accurately and securely at the position where the task is to be performed by the worker.

Solution to Problem

To achieve the above objective, in the first aspect of the present invention, a working support robot system includes: a delivery mechanism for delivering either tools or parts, or both, to a worker; a measuring unit for measuring the position of the worker; a work progress estimation unit for estimating the work progress based on data input from the measuring unit while referring to data on work procedure, and for selecting objects necessary for the next task when the work is found to have advanced to the next procedure; and a motion planning unit for planning the motion of the delivery mechanism to control the delivery mechanism based on the work progress estimated by the work progress estimation unit and selected objects.

To achieve the above objective, in the second aspect of a present invention, a working support robot system includes: a robot arm; a measuring unit for measuring the position of the worker; a work progress estimation unit for estimating the work progress based on data input from the measuring unit while referring to data on a work procedure, and for selecting objects necessary for the next task when the work is found to have advanced to the next procedure; and an arm motion planning unit for planning the trajectory of the robot arm to control the robot arm based on the work progress estimated by the work progress estimation unit and selected objects.

To achieve the above objective, in the third aspect of the present invention, a working support robot system includes: a measuring unit having sensors; a work status identifying unit for identifying the work status based on data input from the measuring unit; a computation and database unit capable of computing and holding probability distribution of execution probabilities of work with respect to time, and computing execution probabilities of work with respect to time, based on the work status input from the work status identifying unit; and a delivery timing determining unit for determining the delivery timing based on the execution probabilities of work with respect to time computed by the computation and database unit.

In the fourth aspect of the present invention, a working support robot system includes: a measuring unit having sensors; a worker's position identifying unit for identifying the worker's position based on data input from the measuring unit; a computation and database unit for computing and holding the probability distribution of the existence probabilities of the worker's position, and for computing the existence probabilities of the worker's position based on the worker's position input from the worker's position identifying unit; a delivery position determining unit for determining the delivery position based on the existence probabilities of the worker's position determined by the computation and database unit; and a delivery trajectory computation unit for computing the trajectory of a delivery mechanism based on the delivery position determined by the delivery position determining unit.

Advantageous Effects of Invention

According to the first aspect of the present invention, the work progress estimation unit estimates the work progress status based on data input from the measuring unit while referring the data on the work procedure, and the work progress estimation unit selects objects necessary for the next task when the work is found to have advanced to the next procedure. Meanwhile, the motion planning unit plans and controls the delivery mechanism based on the work progress estimated by the work progress estimation unit and the selected objects. That is, the delivery mechanism is controlled depending on the work progress, and the delivery mechanism is made to deliver tools and parts necessary for the task. Work efficiency can thus be improved, and work procedure error can be prevented.

According to the second aspect of the present invention, the work progress estimation unit estimates the work progress status based on data input from the measuring unit while referring to the data on the procedure, and the work progress estimation unit selects objects necessary for the next task when the work is found to have advanced to the next procedure. Meanwhile the arm motion planning unit plans the trajectory of the robot arm to control the robot arm based on the work progress estimated by the work progress estimation unit and the selected objects. That is, the trajectory of the robot arm is controlled in accordance with the work progress, and the robot arm delivers tools and parts necessary for the work accordingly. Work efficiency can thus be improved, and work procedure error can be prevented.

According to the third and the fourth aspects of the present invention, the relation between the task and the position of the worker obtained from the sensors of the measuring unit is statistically described and updated in the computation and database unit, and working support motion is established based on the output of the computation and database unit. Consequently, by statistically analyzing the chronological data of the worker's position, the time spent for the procedure, moving route of the worker, behavioral tendency of the worker, and so on can be assessed to statistically computes the work progress, thus ensuring smooth delivery of parts and tools in accordance with the movement of the worker. Unlike conventional systems, the worker need not repetitively return from the working position to the trolley to select and pick up parts and then goes back to the working position. The present invention thus provides excellent effect including improved work efficiency and prevention of work procedure errors.

REFERENCE SIGNS LIST

Figure 1:
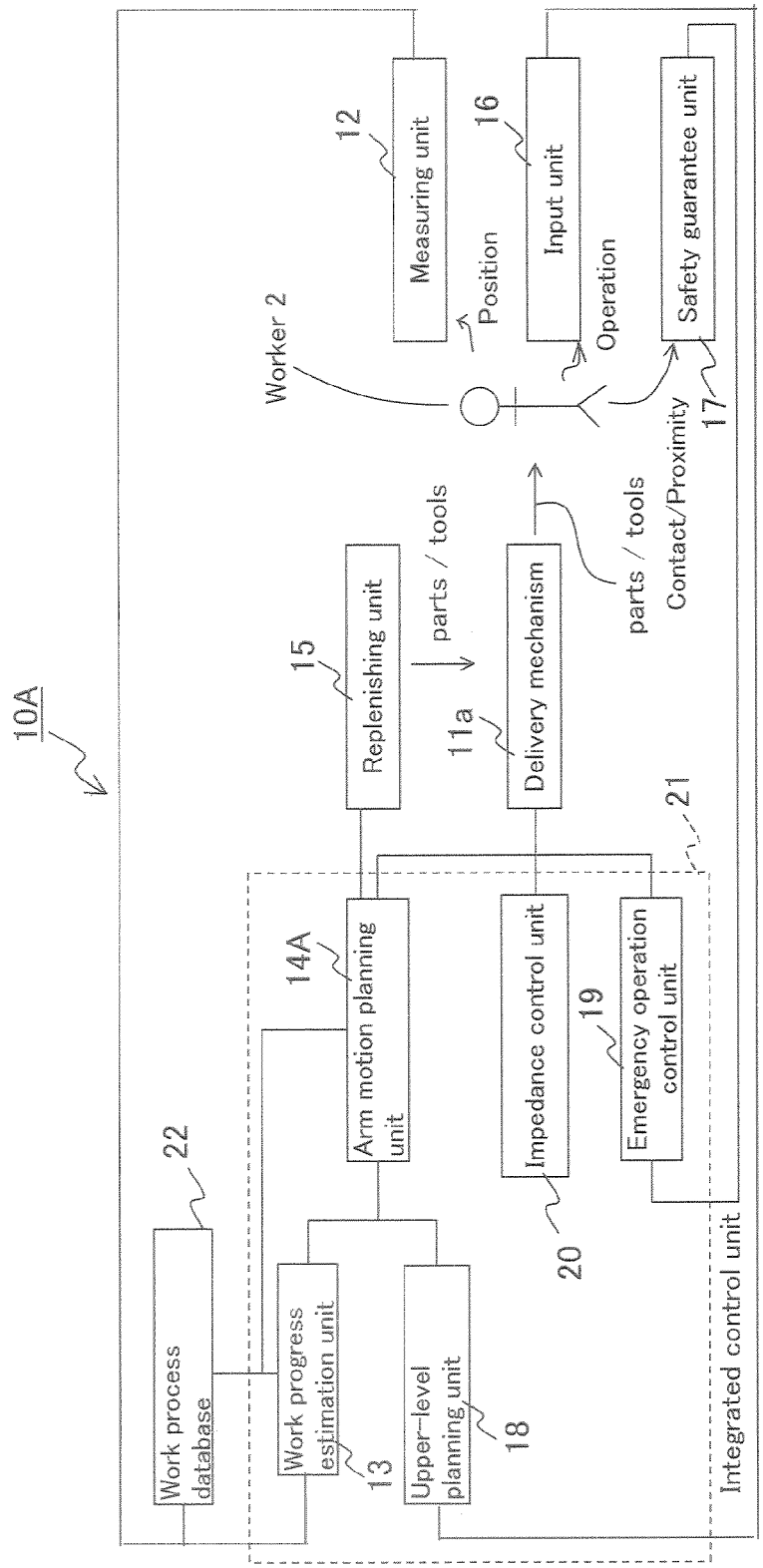
FIG. 1 is a block diagram of the working support robot system related to the first embodiment of the present invention.

1: Automobile body
2. Worker
10, 10A, 40, 40A: Working support robot system
11: Robot arm
11a: Delivery mechanism
11A, 11B, 11C: Joint
11D, 11E: Arm
11F: Attachment for mounting tools
11G: Parts Tray
12: Measuring unit
12A, 12B: Sensor
13: Work progress estimation unit 14: Arm motion planning unit
15: Replenishing unit
16, 50: Input unit
17, 51: Safety guarantee unit
18, 53: Upper-level planning unit
19, 52: Emergency operation control unit
20, 54: Impedance control unit
21: Integrated control unit
22: Work process database
30: Cabinet
31: Table
32: Discharge port
33: Toolbox
34: Tool
35: Parts
41: Robot
42: Measuring unit
43: Worker's position identifying unit
44: Work progress estimation unit
45: Computation and database unit
45A: First computation unit
45B: Second computation unit
45C: Third computation unit
46: Delivery position determining unit
47: Delivery timing determining unit
48: Delivery trajectory computation unit
49A: Real-time delivery time adjustment unit
49B: Delivery position adjustment unit
49C: Delivery time adjustment unit
55: Work status identifying unit
56: Worker's position and work status identifying unit

DESCRIPTION OF EMBODIMENTS

Some of the embodiments of the present invention will hereinafter be described in detail by referring to the drawings, assuming that a working support robot system is placed in an automobile assembly line. The present invention is applicable to various cases in which a delivery mechanism, such as a robot arm or equivalent mechanism, is controlled to support the work performed by workers, within the range where the gist of the present invention is not changed.

First Embodiment

Figure 2:
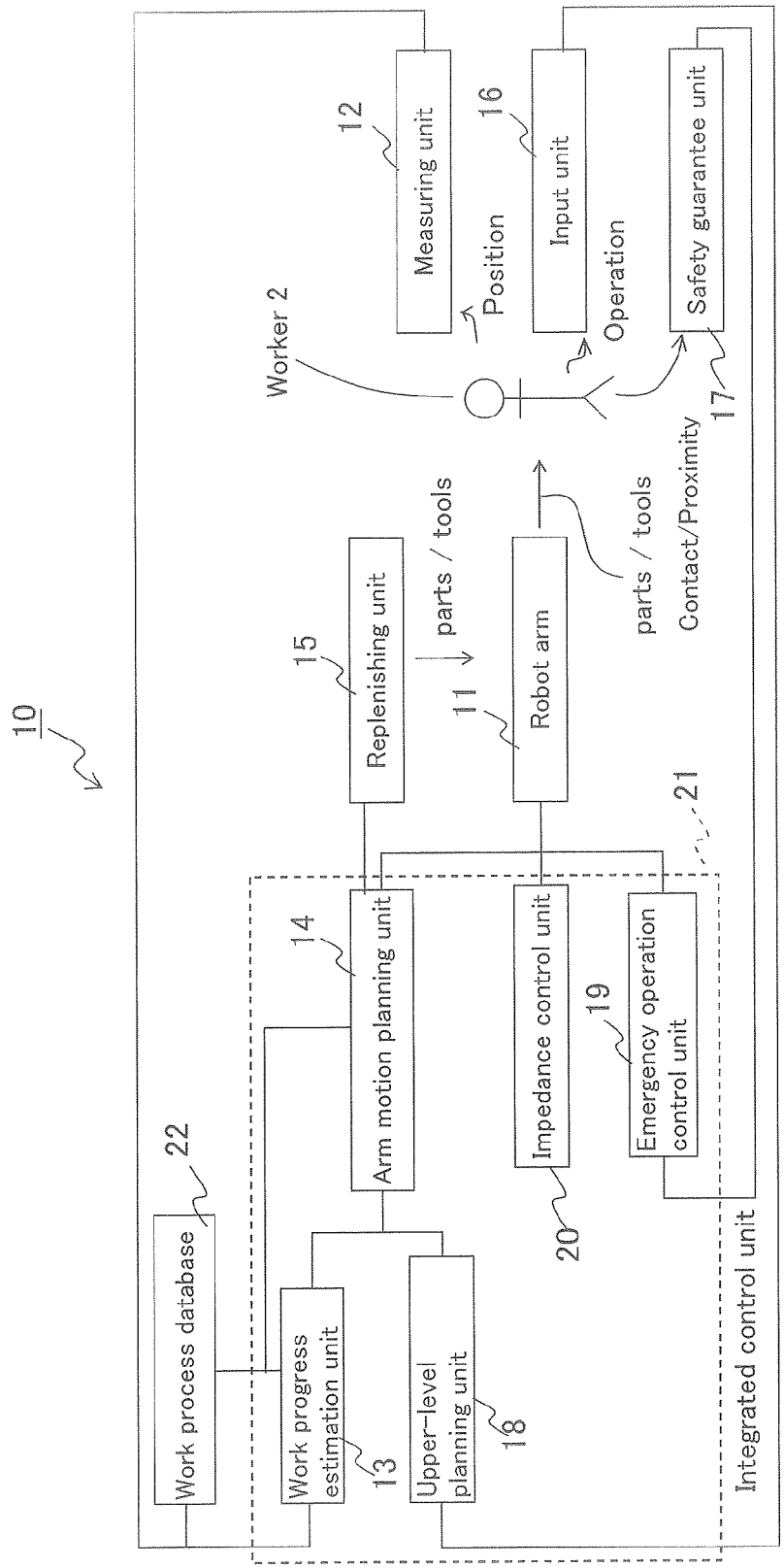
FIG. 2 is a block diagram illustrating an instance of the working support robot system shown in FIG. 1.
Figure 3:
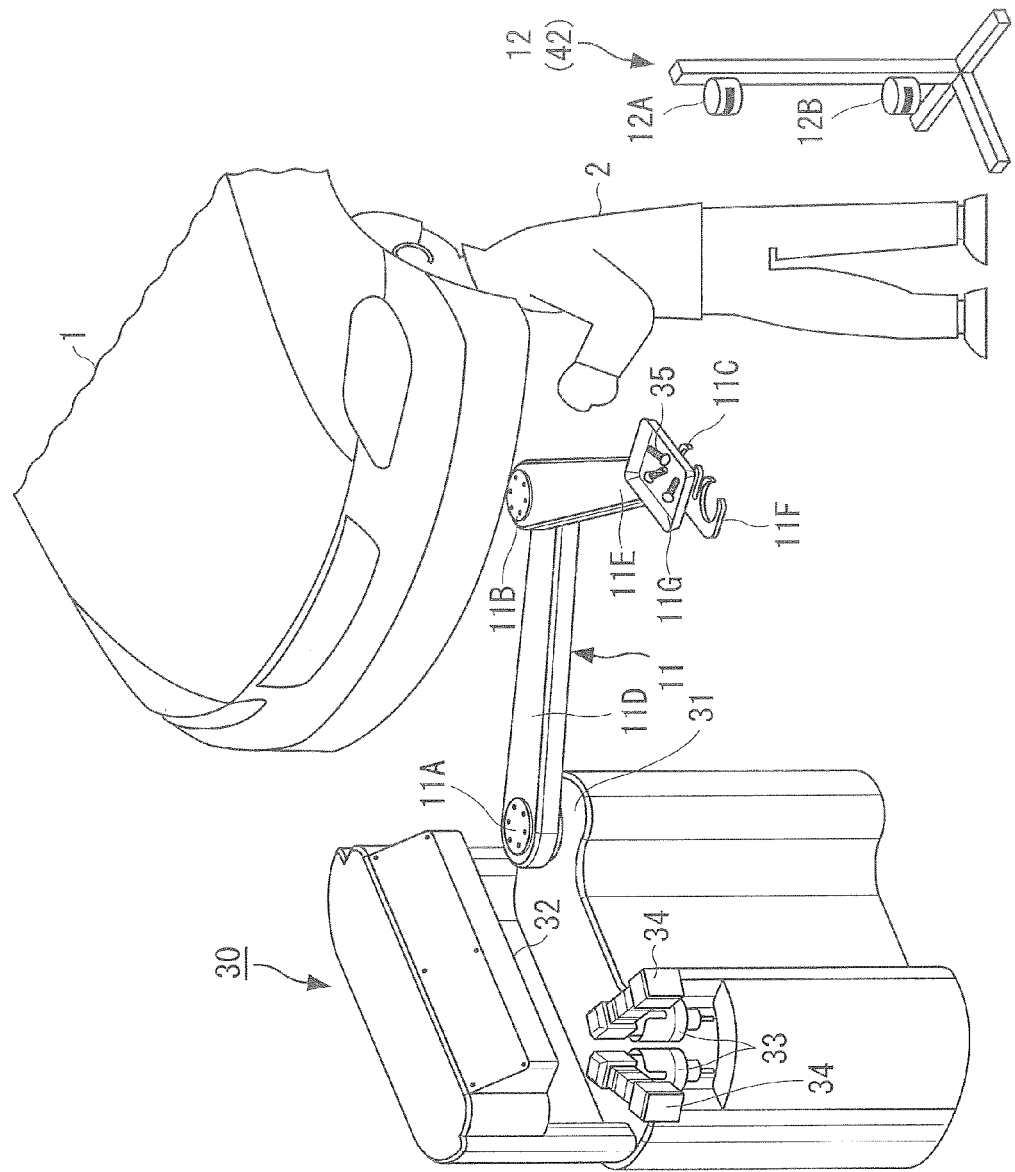
FIG. 3 is a view illustrating a scene where the working support robot system in the first and the second embodiments of the present invention is used.

FIG. 1 is a block diagram illustrating a working support robot system related to the first embodiment of the present invention. FIG. 2 is a block diagram illustrating an example of the system shown in FIG. 1. FIG. 3 is a pattern diagram illustrating a scene where the working support robot system shown in FIGS. 1 and 2 is placed in an automobile assembly line. In each of these figures, the same or practically the same components are given the same sign.
[Overall Configuration of the Working Support Robot System]
As shown in FIG. 1, the working support robot system 10A related to the first embodiment of the present invention includes: a delivery mechanism 11a for delivering objects such as parts and tools; a measuring unit 12 for measuring the position of the worker; a work progress estimation unit 13 for estimating the work progress and selecting objects such as parts and tools; and an motion planning unit 14A for controlling the delivery mechanism 11a. The work progress estimation unit 13 estimates the work progress based on the data input from the measuring unit 12 while referring to the data concerning a work procedure, and selects parts and tools necessary for the next task when the work is found to have advanced to the next procedure. The motion planning unit 14A plans the motion of the delivery mechanism 11a in accordance with the work progress estimated and the objects selected by the work progress estimation unit 13, and thus controls the delivery mechanism 11a.

The working support robot system 10 shown in FIG. 2 is equipped with one or more robot arm(s) 11 as a delivery mechanism 11a, and an arm motion planning unit 14 as a motion planning unit 14A. The arm motion planning unit 14 is a means to plan the trajectory of the robot arm 11 based on the work progress estimated by the work progress estimation unit 13 and the selected objects, thus controlling the robot arm 11.

The working support robot system 10 shown in FIG. 2 includes: one or more robot arm(s) 11; measuring unit 12 for measuring the position of the worker; a work progress estimation unit 13 for estimating the work progress based on data input from the measuring unit 12 while referring to the data related to work procedures, and selecting parts and tools necessary for the next task when the work is found to have advanced to the next procedure; and an arm motion planning unit 14 for planning the trajectory of the robot arm 11 based on the work progress estimated and objects selected by the work progress estimation unit 13, and thus controlling the robot arm 11. The following description assumes the working support robot system 10 shown in FIG. 2.

As shown in FIG. 2, the working support robot system 10 includes: a replenishing unit 15 for replenishing parts and tools; an input unit 16 for receiving commands input from the worker to the robot arm 11; a safety guarantee unit 17 for ensuring work safety by preventing the robot arm 11 from contacting the worker and from colliding with the automobile body or facilities; an upper-level planning unit 18 for planning the motion of the robot arm in response to the input from the input unit 16; an emergency operation control unit 19 for controlling the robot arm 11 in an emergency in response to the input from the safety guarantee unit 17; and an impedance control unit 20 for controlling the impedance in the robot arm 11. Since the replenishing unit 15 supplies parts and tools to the parts tray 11G of the robot arm 11, it can also be called a delivery unit.

With the working support robot system 10 shown in FIG. 2, the work progress estimation unit 13, the upper-level planning unit 18, the arm motion planning unit 14, the impedance control unit 20, and the emergency operation control unit 19 cooperate organically with each other to constitute an integrated control unit 21.

Each output information from the work progress estimation unit 13 and the upper-level planning unit 18 is input to the arm motion planning unit 14, which then plans the trajectory of the robot arm 11 based on the received output information. Each output information from the arm motion planning unit 14, impedance control unit 20, and emergency operation control unit 19 is input to the robot arm 11 to control the robot arm 11.

The working support robot system 10 shown in FIG. 2 is equipped with a work process data base 22, in which not only the details of each work process corresponding to the task of the worker but also the work procedure data to be described later is accumulated. The work procedure data is referred to by the work progress estimation unit 13 and the arm motion planning unit 14.

The following description assumes that the working support robot system is equipped with a work process database 22. However, the description also applies to a case in which work procedure data is externally transmitted to the integrated control unit 21 of the working support robot system 10 as required via a network such as LAN.

The case in which the working support robot system 10 is installed in an automobile assembly line will hereinafter be described. FIG. 3 is a view illustrating a scene where the working support robot system 10 is used. In the automobile assembly line, the automobile body 1 is supported by a pair of L-shaped arms (not shown), for example, and the automobile body 1 is assembled while being transferred. Although only one cabinet 30 is shown in the figure, cabinets 30 are installed at intervals along the line of transfer of the automobile body 1. The cabinet 30 is equipped with a table 31 for placing objects required by the worker 2 such as tools and parts, and a discharge port 32 for supplying necessary parts to the parts tray 11G is installed above the table. The robot arm 11 is mounted to one end of the table 31 in movable state. FIG. 3 illustrates the case in which only one robot arm 11 is installed. However, two or more robot arms, arms in general, can be provided in accordance with the number of processes.

The robot arm 11 includes two or more joints connected with each other, with the links remained in movable state. The robot arm 11 is a selective compliance assembly robot arm (SCARA) having two degrees of freedom, for example. In the example shown in FIG. 3, the first joint 11A connects the table 31 and the first arm 11D, the second joint 11B connects the first arm 11D and the second arm 11E, and the third joint 11C connects the second arm 11E and the attachment for mounting tools 11F and the parts tray 11G. The first, second, and third joints 11A, 11B, and 11C all have a rotating shaft placed in parallel to each other along the vertical direction. On the side of the cabinet 30 opposite to the side where the robot arm 11 is mounted in movable state, a plurality of toolboxes 33 are installed. Various manual or electric tools 34 such as screwdrivers and torque wrenches are inserted into the tool boxes 33, allowing the robot arm 11 or the worker to pick them up.

The cabinet 30 encloses not only the driving unit of the robot arm 11 such as driving power supply but also relatively small parts 35 of various types such as screws and nuts, which are discharged from the discharge port 32 toward the table 31. If the parts tray 11G is placed above the table 31 by driving the joints 11A, 11B, and 11C, the parts 35 can be placed on the parts tray 11G. By driving each joint 11A, 11B, and 11C of the robot arm 11, the parts 35 can then be delivered to a place near the worker, who can also pick up a desired tool 34.

[Configuration of Each Component of the Working Support Robot System]

The configuration of the working support robot system 10 and 10A shown in FIGS. 1 and 2 will hereinafter be described in detail. The robot arm 11 as the delivery mechanism 11a is configured with its arms connected with joints. A multiple joint robot arm driven on the same horizontal plane as shown in FIG. 3 or the one driven both in horizontal and vertical directions can be selected. The delivery mechanism 11a shown in FIG. 1 is not limited to the robot arm 11 shown in FIG. 2. The configuration of the delivery mechanism 11a depends on the process. The delivery mechanism 11a may be a linear-motion table having one degree of freedom, meaning that it does not have two or more joints for delivering tools or parts, or both. The delivery mechanism 11a may be a movable carrier that can deliver either tools or parts, or both. As shown in FIG. 3, the robot arm 11 may be mounted to the cabinet 30 in movable state, to the fixed facilities on the line, or to a movable object such as a carrier.

The replenishing unit 15 holds various bolts and nuts of different sizes and specifications by type, and discharges necessary parts to a specified discharge port in response to external commands, such as those from the arm motion planning unit 14. The replenishing unit 15 is installed to allow necessary tools for the work to be selected.

Figure 4:
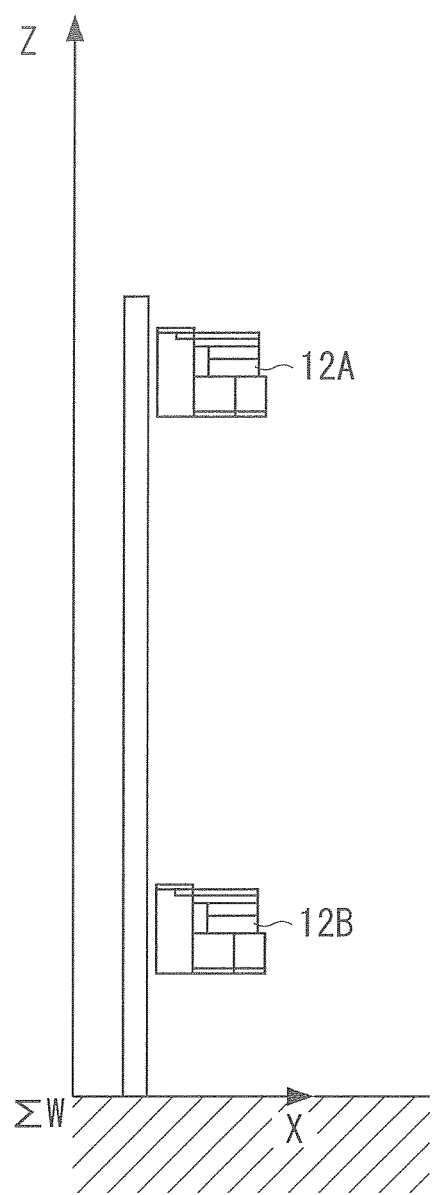
FIG. 4 illustrates the installation status of the sensor in the measuring unit shown in FIG. 3.

The measuring unit 12 can be configured, with an IC tag and a receiver mounted on a floor surface, and so on, or a pressure sensor embedded on the floor surface, to directly locate the position of the worker. The measuring unit 12 consists of one or more sensors of various types. The types of the sensors used include a range sensor or optical sensor such as CCD camera, for convenience sake. The laser range sensor irradiates laser beam and detects the laser beam reflected from various objects such as placed objects, moving workers, automobile bodies. This range sensor, which is also called a laser range finder (LRF), can be mounted to the cabinet 30 shown in FIG. 3, for example, or any other facilities on the line. For example, two sensors can be installed vertically apart from each other. FIG. 4 illustrates the installation status of the sensors in the measuring unit 12. To specify the position of the worker's waist, one of the sensors, namely a first sensor 12A, is installed at a position of the average height of the waist of workers from the floor surface. The other sensor, a second sensor 12B, is installed at a position of the average height of the feet of workers from the floor surface, in order to detect the knee joint or heel position of the worker. The X-axis and Z-axis in FIG. 4 represent a coordinate system fixed to the floor surface.

The input unit 16 receives command input from the worker to the robot arm 11, and includes either a verbal teaching unit or a nonverbal teaching unit, or both. The verbal teaching unit has a microphone and a verbal recognition function. The non-verbal teaching unit has an operation button and/or operation lever, detects the operation status of the operation button and/or operation lever, and converts them into signals.

The safety guarantee unit 17 inputs signals to the emergency operation control unit 19 if the possibility of the robot arm 11 of colliding with other objects, such as a moving automobile body 1, worker 2, or other facilities, increases.

The integrated control unit 21 controls the robot arm 11 and the replenishing unit 15 in response to the input from the measuring unit 12, input unit 16, and safety guarantee unit 17. In detail, the integrated control unit 21 integrates a work progress estimation unit 13, upper-level planning unit 18, arm motion planning unit 14, impedance control unit 20, and emergency operation control unit 19. In the example shown in FIG. 1, the integrated control unit 21 is connected to the work process database 22 within the working support robot system 10. It may also be possible to connect the working support robot system 10 to a control center of the factory (not shown) to allow work procedure data to be input to the integrated control unit 21 from the control center as required.

[Configuration of Each Part of the Integrated Control Unit]

The configuration of each part of the integrated control unit 21 will hereinafter be described in detail.

The work progress estimation unit 13 estimates the work progress by the worker based on the output data from the measuring unit 12. In detail, the work progress estimation unit 13 has the function of specifying the position of the worker and the function of identifying the procedure of the worker based on the worker's position. Now let the former be called the worker's position identifying function, and the latter the worker's procedure identifying function.

The worker's position identifying function performs clustering of the output data of the sensors, and specifies the cluster of the worker to identify the worker's position. The output data of the sensor, namely the set of reflecting points, is subjected to clustering to classify the points in feature space into several groups depending on their distribution status. For clustering, some known techniques, such as the nearest neighbor (NN) method, K nearest neighbor algorithm (K-NN) method, and K mean algorithm (K mean) method, are used (Non Patent Literature 1). Even if the output data from the sensor is subjected to clustering, it is difficult to distinguish the data obtained by detecting laser beam reflected on the worker from the data obtained by detecting laser beam reflected on objects other than the worker, such as objects installed on the assembly line or the automobile body 1.

In the example shown in FIG. 4, the first sensor 12A and the second sensor 12B are installed apart from each other in vertical direction, around the height of the worker's waist and around that of his/her feet. The output data from the first sensor 12A is subjected to clustering to compute data for identifying the worker's position, and also the output data from the second sensor 12B is subjected to clustering to compute data for identifying the position of the worker. Now let the result obtained by clustering from the output data of the first sensor 12A be called "waist cluster," and let the result obtained by clustering from the output data of the second sensor 12B be called "feet cluster." Based on the positional relation between the waist and both feet of the worker, it is assumed that there are two feet clusters within a certain distance from the waist cluster for displaying the position of the worker on a horizontal plane. The work progress estimation unit 13 determines that the data is on the worker if two feet clusters are found to exist within a specified range of radius from the center of the waist cluster based on the result of clustering of the data input from the measuring unit 12, first. For the sake of convenience of description, let the combination of one waist cluster and two feet clusters be called "a worker cluster". The work progress estimation unit 13 assesses the data on the worker, namely, the worker cluster, every time the sensor output data is input from the measuring unit 12, or depending on the number of times of input, for specified number of times. Unlike the above, after having specified the worker cluster based on the output data from the measuring unit 12, the work progress estimation unit 13 calculates the distance between the worker cluster of the previous cycle and each waist cluster currently measured with the sensors, and identifies the nearest waist cluster as the worker cluster. The worker cluster may subsequently be kept updating. In this case, the work progress estimation unit 13 specifies the worker cluster from the waist cluster only, unless the worker suddenly moves a great distance. The work progress estimation unit 13 specifies the worker cluster, following the procedure described above. In addition, based on all the data included in the worker cluster, the typical point specifying the position of the worker is defined as "worker representative point," which is used to determine the procedure of the worker as the worker's positional information. The worker representative point is calculated by averaging all the data (coordinate, for example) contained in the worker cluster.

Figure 5:
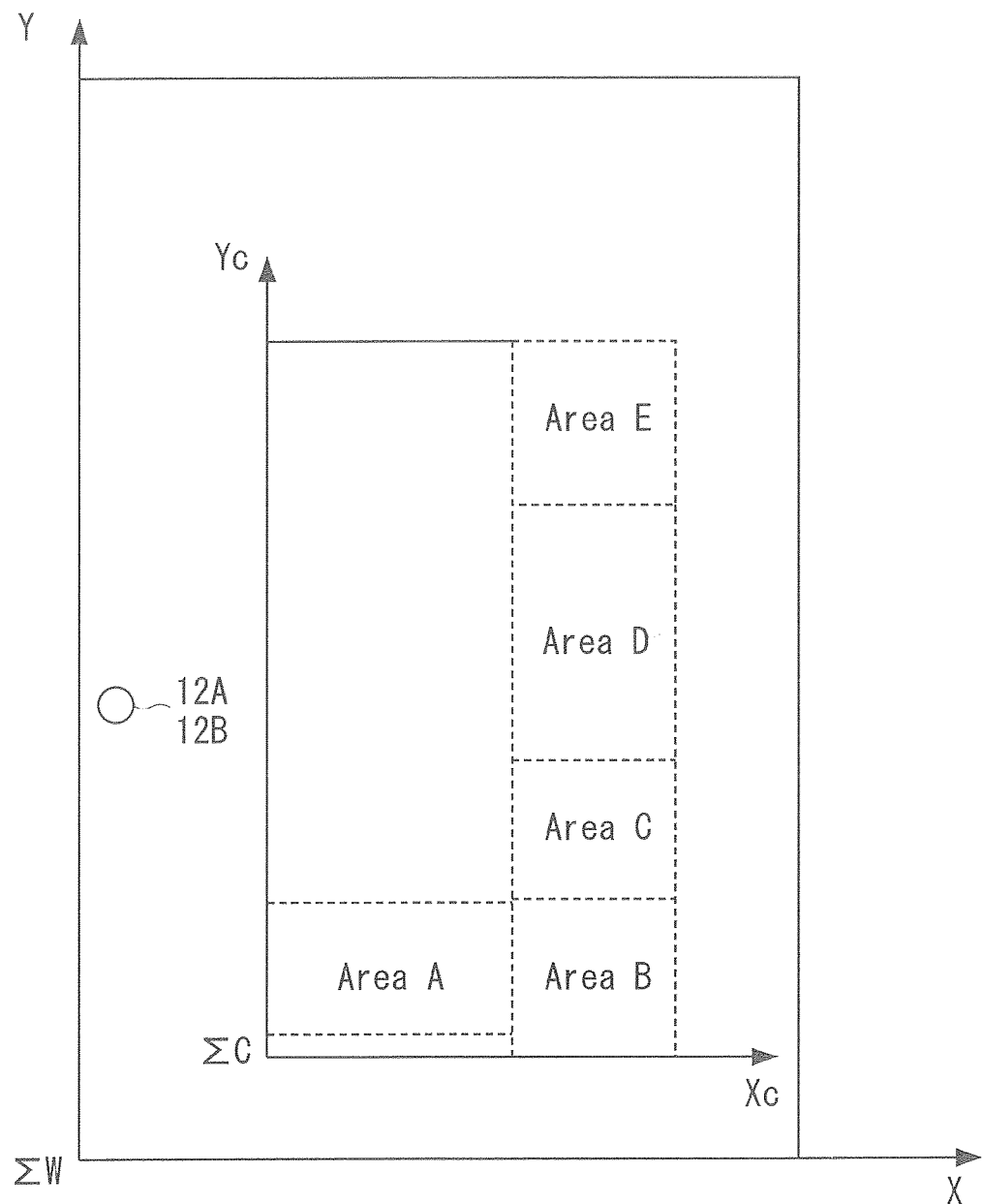
FIG. 5 shows a typical working space arrangement.
Figure 6:
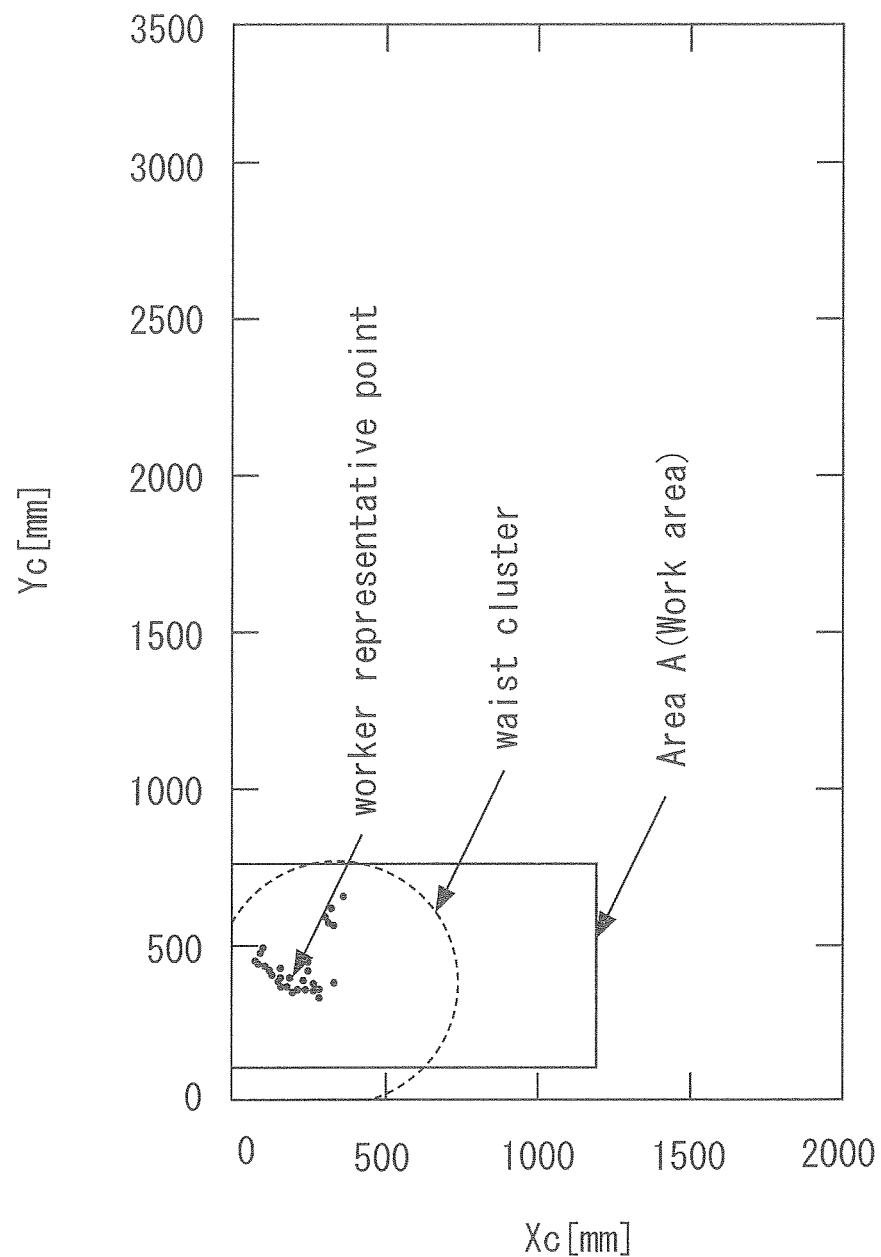
FIG. 6 is a chart describing the worker's position identifying function of the work progress estimation unit.

As shown in FIG. 5, the work space is divided into two or more areas. On the coordinate system shown in FIG. 5, Xc-axis and Yc-axis are defined with respect to the automobile body transferred along the assembly line. Areas A, B, C, D, and E, five areas in total, exist on the coordinate system defined by Xc-axis and Yc-axis. The size, position, and number of the areas can be arbitrarily determined according to the details of the process. These areas are defined so that each task is to be performed in only one area. FIG. 6 is a chart describing the worker's position identifying function of the work progress estimation unit 13. From FIG. 6, the waist cluster is found on the Xc-Yc plane, and the worker representative point is found at the center of the cluster. From the worker representative point on the Xc-Yc plane coordinate, it is found that the worker is at his/her task within area A.

The other function of the work progress estimation unit 13, namely worker's procedure identifying function, determines the procedure which the worker executes at that time based on the worker's position. More specifically, the procedure of the worker is determined based on the worker representative point obtained by the worker's position identifying function described previously and the work procedure data defined in advance. The worker's procedure identifying function will hereinafter be described in detail. The work procedure of a worker is determined based on the process of his/her work. The work procedure data must contain at least the procedure number and the work space, and preferably procedure number, work space, and procedure time, as mandatory elements. The work space where the worker executes his/her task is divided into two or more areas, and which area is the relevant work area is shown. For the sake of convenience, let each divided area be called a segment area.

FIG. 5 shows a typical work space arrangement. In the example shown in FIG. 5, the coordinate system is defined with respect to the automobile body transferred along the assembly line, with Xc-axis and Yc-axis shown in the figure. Areas A, B, C, D, and E, five segment areas in total, exist on the coordinate system defined by Xc-axis and Yc-axis. These areas are defined so that only one task is to be performed in each area. If the work space A (i) is to be changed according to task number i, it is only necessary for the work procedure data to include the task number i and work space A (i) as elements. In the case in which the work space A (i+1) is the same as the work space A (i) even if the task number i is changed to the next task number i+1, it is only necessary for the work procedure data to include the task number i, work space A (i), and work time t (i) as elements. "i" here is defined as a natural number equal to or larger than 1 up to the number of work task.

Since work procedure data has such a data structure, the transition of work process is also regarded as the transition of work area, and the task is estimated based on the position of the worker representative point. Specifically, if the worker representative point moves from one work area to the next, the work process judgment result is also transferred to the next task. Note, however, that if the two or more tasks are performed continuously within the same work area, the transition of the task cannot be identified only from the position of the worker representative point. To solve this problem, transition of task is judged by comparing the specified work time for each task with the elapsed time. Tasks are performed in the order of given work numbers, and they are not executed in reverse order. Consequently, if the task advances to the next one, the work representative point may return to the work area of the previous process, but the task never returns to the previous one, unless the work process number is reset.

As described above, the work progress estimation unit 13 specifies the position of the worker based on the output data from the sensor of the measuring unit 12, and assesses the work progress of the worker. If work process advances to the next one, the work progress estimation unit 13 outputs signals to the arm motion planning unit 14, indicating that the task has advanced to the next one.

The upper-level planning unit 18 converts the forcible command related to the robot arm 11 transmitted from the worker via the input unit 16 into a signal for the arm motion planning unit 14, and outputs the result to the arm motion planning unit 14.

Receiving signal input from the work progress estimation unit 13, meaning that the work has advanced to the next process, the arm motion planning unit 14 creates a plan for driving the robot arm 11 depending on the next work, while referring to the data concerning the work procedure accumulated in the work process data base 22. Basically, the robot arm 11 sets tools and parts necessary for the next task, that is, the task following of currently performed task, to be performed by the worker, on the parts tray, and heads toward the next delivery position. Receiving the command input of the worker concerning the robot arm 11 via the upper-level planning unit 18, the arm motion planning unit 14 drives the robot arm 11 in response to the command of the worker within the permissible range based on the work progress. The arm motion planning unit 14 stores a number of motion files concerning the driving of the robot arm 11, for example. The arm motion planning unit 14 selects one motion file based on the result input from the work progress estimation unit 13 and the upper-level planning unit 18, and outputs the file to the robot arm 11. The arm motion planning unit 14 then drives the robot arm 11 according to that motion file.

A motor and an encoder are mounted to each joint of the robot arm 11. The impedance control unit 20 computes the impedance displacement based on the feedback signal from the encoder and operation status from the input unit 16 to control the robot arm 11 smoothly.

The emergency operation control unit 19 forcibly controls the robot arm 11 to make it remain within a safe range, in response to the signal input from the safety guarantee unit 17. This forcible control prevents the collision between the robot arm 11 and the moving automobile body 1, worker 2, and facilities, for example.

[Working Support Method]

The working support method will hereinafter be described in detail, assuming that the working support robot system 10 is integrated in the automobile assembly line shown in FIG. 3.

Workers perform assembly work of the automobile body 1 moving along the assembly line based on the work process. One of the workers is deployed at the specified position on the assembly line, and sequentially performs tasks such as refastening parts on the rear side of the front side member as the first task, mounting a fender liner grommet as the second task, and fitting a front brake hose clip on the left side as the third task.

The measuring unit 12 irradiates laser horizontally at specified intervals, detects laser beam reflected, measures the position of the reflection point from the worker, and inputs each output data from the first sensor 12A and the second sensor 12B into the work progress estimation unit 13.

In response to the initial input from the first sensor 12A and the second sensor 12B, the work progress estimation unit 13 subjects the output data to clustering as described previously to compute the waist cluster and the feet cluster, and by extracting the pair of the waist cluster and feet clusters that satisfy the condition that the feet clusters exist within the specified radius range from the center of the waist cluster, computes the worker cluster.

In response to the second and subsequent output data input from the first sensor 12A and the second sensor 12B, the work progress estimation unit 13 subjects the output data to clustering, and computes the cluster adjacent to the waist cluster computed previously as the waist cluster of this time.

The work progress estimation unit 13 specifies the position of the worker by the data input from the measuring unit 12 based on the waist cluster thus computed, and estimates in which segment area the worker exists. The segment area is previously divided. The work progress estimation unit 13 judges which of the following conditions are satisfied: the worker has shifted to the next work area, or the work time specified in the work procedure data has elapsed since the start of one task, even if the worker has not shifted to the next work area. Making affirmative judgment, the work progress estimation unit 13 judges that one task has been completed and the worker has shifted to another task, and outputs the judgment result to the arm motion planning unit 14.

Receiving the information input from the work progress estimation unit 13 concerning the transition of procedure, the arm motion planning unit 14 judges, by referring to the work process data base 22, whether parts are to be supplied from the discharge port 32 of the replenishing unit 15 for the next task, and whether tools 34 are necessary, or not. Judging that parts are to be supplied from the discharge port 32, the arm motion planning unit 14 notifies the replenishing unit 15 of the information of the parts to be supplied such as type and quantity. At the same time, the arm motion planning unit 14 outputs a command to drive the robot arm 11 so that the parts tray 11G, which is mounted at the end of the robot arm 11, is placed in front of the discharge port 32 for a certain period of time to receive the supply of parts 35 from the discharge port 32. At this time, the replenishing unit 15 supplies parts via the discharge port 32 based on the information input from the arm motion planning unit 14 such as the type and quantity of parts to be supplied. The arm motion planning unit 14 not only outputs commands but also selects one of the tools 34 mounted to the cabinet 30, for example, retains the tool 34 by hanging it on the attachment for mounting tools 11F, etc., and issues a command to drive the robot arm 11 to deliver the tool 34 to the vicinity of the worker.

As described above, if the output data from the measuring unit 12 is inputted to the work progress estimation unit 13, the work progress estimation unit 13 specifies the position of the worker, and determines whether the work procedure has shifted to the next one or not. If the work progress estimation unit 13 determines that the work procedure has shifted to the next one, the information is input to the arm motion planning unit 14. Receiving the information on procedure transition, the arm motion planning unit 14 calculates the trajectory of the robot arm 11, and so on based on the work procedure data and drives the robot arm 11, and at the same time, if the type and quantity of parts to be supplied to the next task have been set in the work procedure data, notifies the replenishing unit 15 of that information. Consequently, even if the work has advanced to the next process, the worker can receive necessary parts and tools only by moving to the area where the intended work is to be performed, as if delivered by hand.

In other word, the working support robot system 10 repeats a series of work as shown below. If the measuring unit 12 inputs the output data of the sensor to the work progress estimation unit 13, the work progress estimation unit 13 judges whether the work procedure has shifted to the next one. If judged that the procedure has shifted to the next one, the information is output to the arm motion planning unit 14, and the parts necessary for the next task is transferred to the robot arm 11. If the input unit 16 receives the worker's input in the middle of the series of repetitive operations, the information is input to the upper-level planning unit 18, and the arm motion planning unit 14 forcibly controls the robot arm 11 to reflect the intention of the worker. Furthermore, if the safety guarantee unit 17 inputs something that inhibits the motion of the robot arm 11 to the emergency operation control unit 19, the series of repetitive operation is suspended, and the collision avoidance motion of the robot arm 11 is executed. Consequently the working support can be performed more appropriately.

The above description assumes that the delivery mechanism 11a shown in FIG. 1 is the robot arm 11, and the motion planning unit 14A is the arm motion planning unit 14. However, the delivery mechanism 11a can be an arm having one degree of freedom, linear-motion table, or movable carrier traveling directly on the floor surface, on condition that they can deliver either tools or parts, or both, to the worker. In view of the above, the motion planning unit 14A is not limited to the arm motion planning unit 14, and anything could function as the motion planning unit 14A, on condition that it can plan the motion of the delivery mechanism 11a based on the work progress estimated by the work progress estimation unit 13 and the selected objects. Since other configurations and resulting function effect and working support methods are the same, the description will be omitted.

As shown in FIGS. 3 and 4, the system configuration shown in FIG. 2 assumes a measuring unit comprised of a plurality of laser sensors placed apart at top and bottom. However, if the position of the worker can be measured, other sensors are acceptable. As an example, pressure sensors can be embedded in the floor surface without gaps. A coordinate system is set on the floor surface, and a plurality of pressure sensors are embedded in a lattice pattern. By performing clustering by the method described previously based on the position of the sensors that have detected pressure, of the plurality of the pressure sensors, the position of the worker can be identified. If some objects are placed on the floor within the work area, or if there is a possibility that other workers may enter the area, and so on, the position of the worker can be assessed more accurately if the worker is identified based on clustering. As another example, pairs of a laser irradiating unit and a laser photoreceptor are installed on the ceiling of the work site in a lattice pattern. Laser beam is irradiated from the laser irradiating unit to the floor surface. If the laser photoreceptor receives the reflection of the laser beam from the floor surface, no workers exist under the pair, and on the contrary, if reflection from the floor surface is not received, it is found that a worker exists under the pair. Installation of pairs of the laser irradiating unit and the laser photoreceptor on the ceiling in a lattice pattern allows you to identify the position of existence of the worker. In this case, also, if some objects are placed within the work area, or other workers may enter the area, etc., the position of the worker can be assessed more accurately if the worker is identified by performing clustering.

In the system configuration shown in FIGS. 1 and 2, since the work progress is estimated based on the position of the worker, the progress cannot be estimated unless the worker follows the work procedure determined in advance. In addition, since every worker has his/her own behavioral tendency, slight deviation of timing may arise. As a system solving this problem, the second embodiment will be described hereunder.

Second Embodiment

Figure 7:
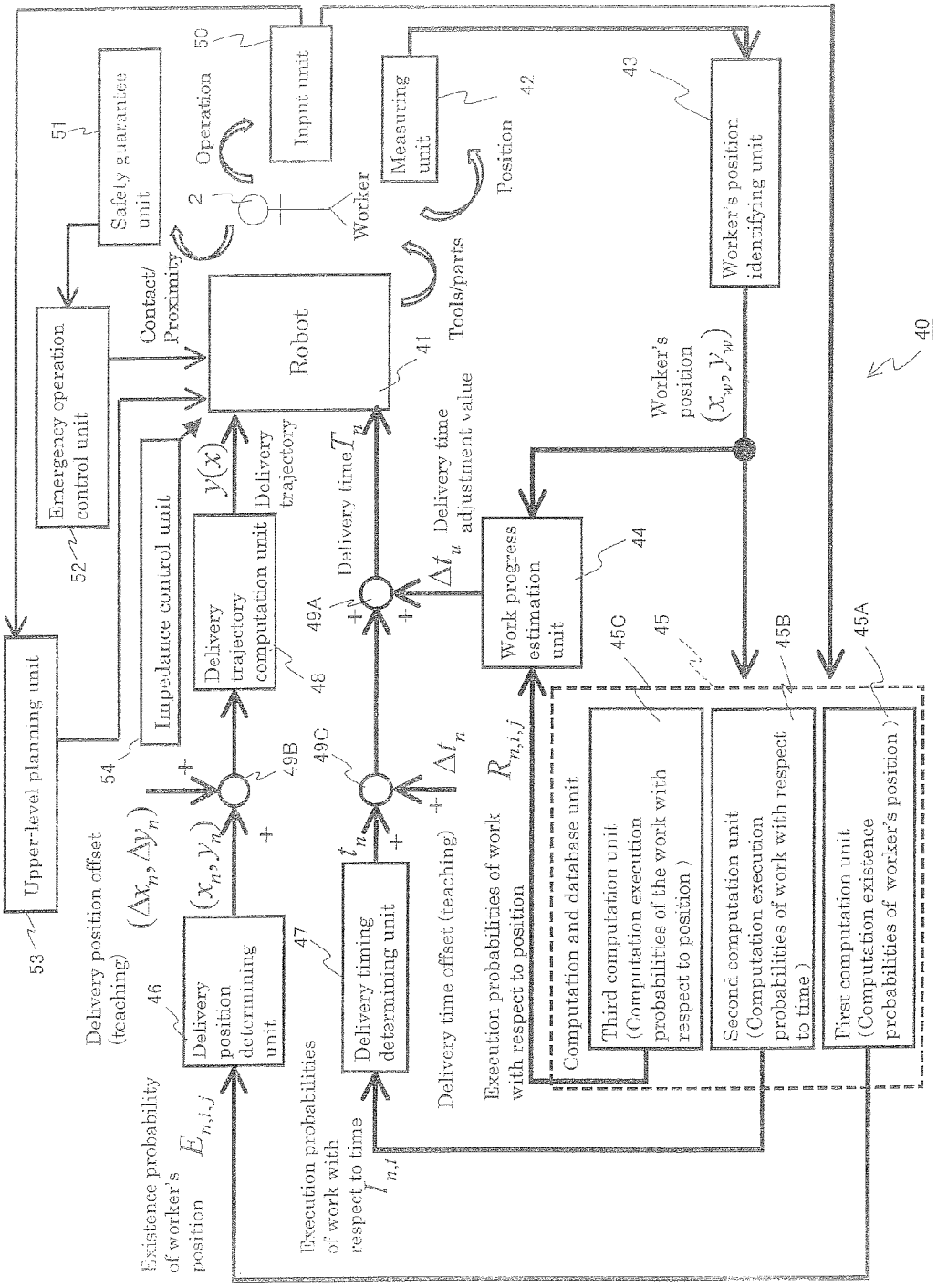
FIG. 7 is a block diagram of the working support robot system related to the second embodiment of the present invention.

FIG. 7 is a block diagram of the working support robot system 40 related to the second embodiment of the present invention. The work process data base 22, work progress estimation unit 13, arm motion planning unit 14, and parts related to the above units have been changed from the system configuration shown in FIG. 1 as described below. In the configuration shown in FIG. 7 also, the input unit 50, safety guarantee unit 51, upper-level planning unit 53, emergency operation control unit 52, and impedance control unit 54 corresponding to the input unit 16, safety guarantee unit 17, upper-level planning unit 18, emergency operation control unit 19, and impedance control unit 20 shown in FIG. 1 respectively may be installed to forcibly control the robot 41 equipped with a robot arm and a replenishing unit.

The working support robot system 40 in the second embodiment of the present invention includes: a robot 41, which corresponds to the robot arm 11 and the replenishing unit 15 in FIG. 1; a measuring unit 42, which corresponds to the measuring unit 12 in FIGS. 1 and 2; a worker's position identifying unit 43; a work progress estimation unit 44; a computation and database unit 45 for computing and storing various probabilities to be described later; a delivery position determining unit 46; a delivery timing determining unit 47; a delivery trajectory computation unit 48; a real-time delivery time adjustment unit 49A; a delivery position adjustment unit 49B; and a delivery time adjustment unit 49C. The second embodiment can be modified in various ways from the one shown in FIG. 7. For example, in the variation of the second embodiment shown in FIG. 8, a work status identifying unit 55 may be installed in addition to the worker's position identifying unit 43. In the working support robot system 40A shown in FIG. 8, the worker's position identifying unit 43 and the work status identifying unit 55 constitute the worker's position and work status identifying unit 56.

As described previously, the robot 41 includes a robot arm; and a replenishing unit for delivering parts on the parts tray mounted at one end of the robot arm. The robot 41 may be substituted by a delivery mechanism for delivering objects such as parts and tools and a replenishing unit.

The measuring unit 42 has a plurality of laser range sensors to identify the position of the worker. As in the embodiment shown in FIG. 1, laser range finders (LRFs) are placed vertically next to each other, and each LRF measures the height of the waist and feet of the worker.

The worker's position identifying unit 43 identifies the position of the worker by subjecting data input from the measuring unit 42 to clustering. As in the embodiment shown in FIGS. 1 and 2, the nearest neighbor method, and so on are applied to the data measured by the measuring unit 42 to perform clustering, and by specifying the worker cluster, the position of the worker $(x_w, y_w)$ is computed.

The computation and database unit 45 computes the existence probabilities of the worker at each position $E_{n, i, j}$, execution probabilities of the work with respect to time $I_{n, t}$, and execution probabilities of the work with respect to position $R_{n, i, j}$ respectively based on the worker's position $(x_w, y_w)$ input from the worker's position identifying unit 43, accumulates and continuously updates those probabilities, and outputs them sequentially. The data of distribution of three probabilities are stored in the first, second, and third computation units 45A, 45B, and 45C respectively.

Figure 9:
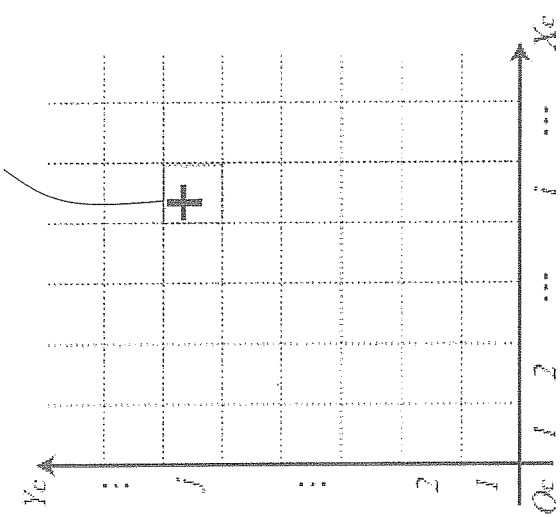
FIG. 9 is a diagram describing the calculation of probability distributions stored in the first computation unit.

The first computation unit 45A contains data on the probability distribution of "the existence probabilities of the worker's position" calculated. The computation method of the probability distribution is as follows. In the coordinate system shown by the mesh of constant width and set with reference to automobiles ("work targets" in general) shown in FIG. 9, the frequency at which the worker is located is measured in each cell and is divided by the total number of data of each task. The ratio thus computed is referred to as the existence probability $E_{n, i, j}$ of the worker's position (i, j) for n-th task. That is, $E_{n, i, j}$ exhibits at which position the worker engaging in the work is most likely to exist when task number n is given, and is given by the following equation:

[Equation 1]

$$E_{n,i,j} = \frac{1}{M} \sum_{m=1}^{M} \left( \frac{C_{m,n,i,j}}{\sum_{i=1}^{200} \sum_{j=1}^{360} C_{m,n,i,j}} \right) \quad (1)$$

where, $C_{m,n,i,j}$ is the number of data points measured in (i, j) coordinates for the n-th task of the m-th automobile, $$\sum_{i=1}^{200} \sum_{j=1}^{360} C_{m,n,i,j}$$

is the total number of worker's positional data for the n-th task of the m-th automobile, and M is the number of automobiles worked on in the data series. The equation (1) implies that the entire area in which the worker may exist is divided into a 200×360 mesh. Consequently, the maximum value of i is the number of cells of the mesh in the x-axis direction (200 in the above equation), and the maximum value of j is the number of cells of the mesh in the x-axis direction (360 in the above equation).

The first computation unit 45A computes $E_{n,i,j}$ for all the tasks and all the positions as the above probability distributions and stores the data obtained. If a task is given, the position where the probability of the worker's existence is the highest when the task is performed can be found statistically.

The delivery position determining unit 46 determines the delivery position based on the existence probability of the worker's position input from the first computation unit 45A. Since the position (i, j) with $E_{n,i,j}$ is the highest has the highest probability worker exists, with respect to each performing task, the coordinate of that position is output as the delivery position $(x_n, y_n)$.

Figure 10:
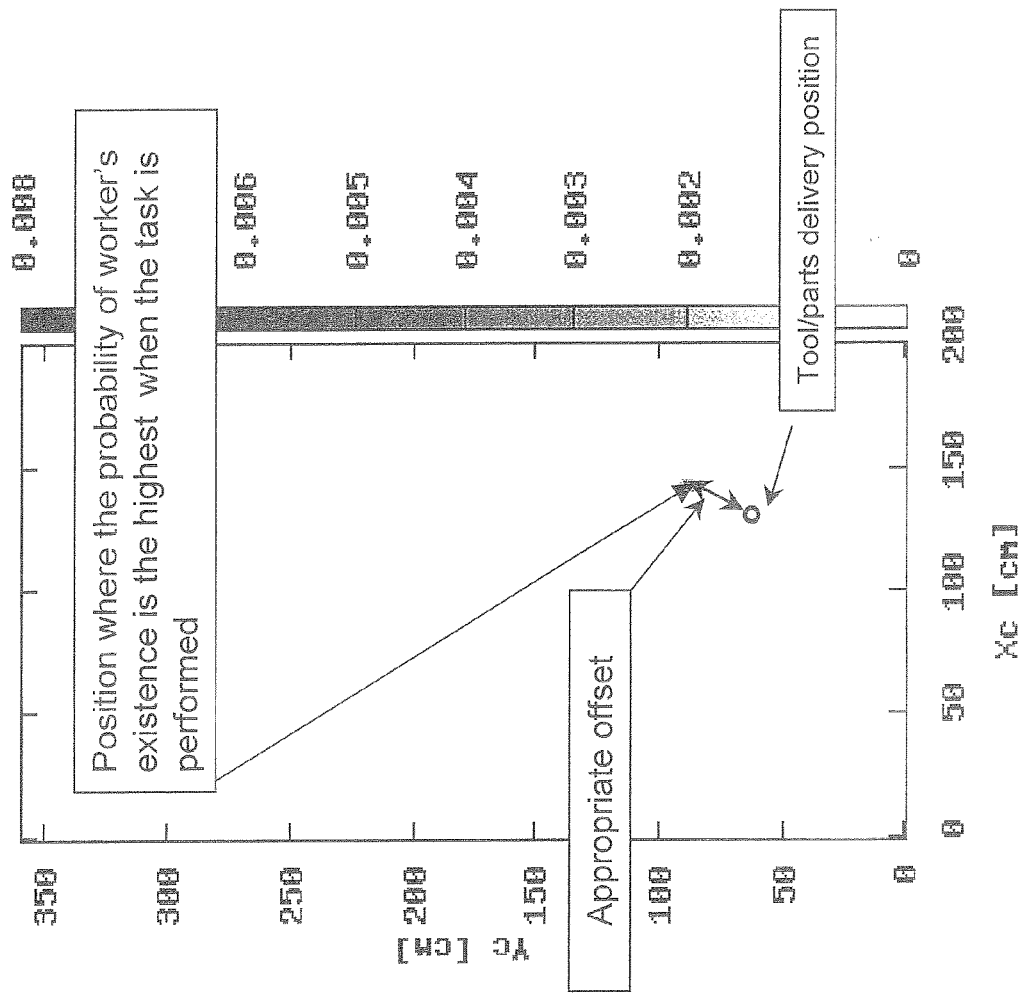
FIG. 10 is a chart illustrating the function of the delivery position determining unit and the delivery position adjustment unit.

The supply position adjustment unit 49B, which is installed between the delivery position determining unit 46 and the delivery trajectory computation unit 48, adds/subtracts the appropriate offset $(\Delta x_n, \Delta y_n)$ to/from the delivery position $(x_n, y_n)$ computed by the existence probability of the worker's position output from the first computation unit 45A, and outputs the result to the delivery trajectory computation unit 48. FIG. 10 is a chart illustrating the function of the delivery position determining unit 46 and the delivery position adjustment unit 49B. The horizontal and vertical axes represent Xc and Yc in the automobile coordinate system. The shading exhibits the height of $E_{n,i,j}$, the round plot exhibits the point of tools/parts delivery position, and the arrow indicates the offset. When performing this task, the delivery position determining unit 46 computes the position having the highest probability of the worker's existence as $(x_n, y_n)$. The computed value $(x_n, y_n)$ is input to the delivery position adjustment unit 49B. The delivery position adjustment unit 49B then adds given offset for the body size of the worker, namely the delivery position offset $(\Delta x_n, \Delta y_n)$, to the coordinate, and regards the obtained coordinate as the delivery position. The offset may be adjusted as required depending on the worker's preference.

If there are two or more positions where the worker's existence probability is high with certain tasks (task A and task E, for example), the position where the task is to be performed ahead of others is selected from these high-probability points, and delivery position offset is added to obtain the delivery position. In addition, since this delivery position is the work position on the automobile coordinate system, it is converted into a robot coordinate system to decide the position of the parts tray 11G of the robot 41.

The second computation unit 52B computes the "execution probabilities of work with respect to time" and stores the probabilities computed. The method of computing the probability distribution is as follows. By dividing the frequency that the worker is engaged in the n-th task at a certain time by the number of automobiles measured, the ratio at which the worker is engaged in n-th task at time t, namely the execution probability of the n-th task at time t, $I_{n,t}$, can be computed. When time t is given, $I_{n,t}$ indicates the task that has the highest probability that the worker is engaged at that time t, and given by equation (2) shown below:

[Equation 2]

$$I_{n,t} = \frac{W_{n,t}}{M} \quad (2)$$

where, $W_{n,t}$ is the frequency that the n-th task is being undertaken at time t, and M is the number of automobiles measured, namely, the number of objects worked on after the start of measurement. Time t is reset to zero every time tact time is started. The second computation unit 45B can obtain the time information reset every time the tact time is started by the method, such as obtaining the information from the automobile conveyer in the factory through communication. In this case, the second computation unit 45B may not have to update the execution probabilities of the work with respect to time every time, and can output the execution probability of the work with respect time computed based on the accumulated data to the delivery timing determining unit 47.

The delivery timing determining unit 47 computes the delivery timing $t_n$ based on the execution probabilities of the work with respect to time input from the second computation unit 45B. Assuming that the worker is engaged in the work having the highest probability at a certain time based on the execution probabilities of the work with respect to time $I_{n,t}$ which is output from the second computation unit 45B, the time of switching from one task to another is found, and consequently, the delivery timing for the next task $t_n$ can be computed.

The delivery time adjustment unit 49C is installed between the delivery timing determining unit 47 and the real-time delivery time adjustment unit 49A, and outputs the result obtained by adding offset $\Delta t_n$ to the delivery time $t_n$, namely the delivery timing computed from the execution probabilities of the work with respect to time, to the real-time delivery time adjustment unit 49A. The delivery timing described above is output from the second computation unit 45B.

Figure 11:
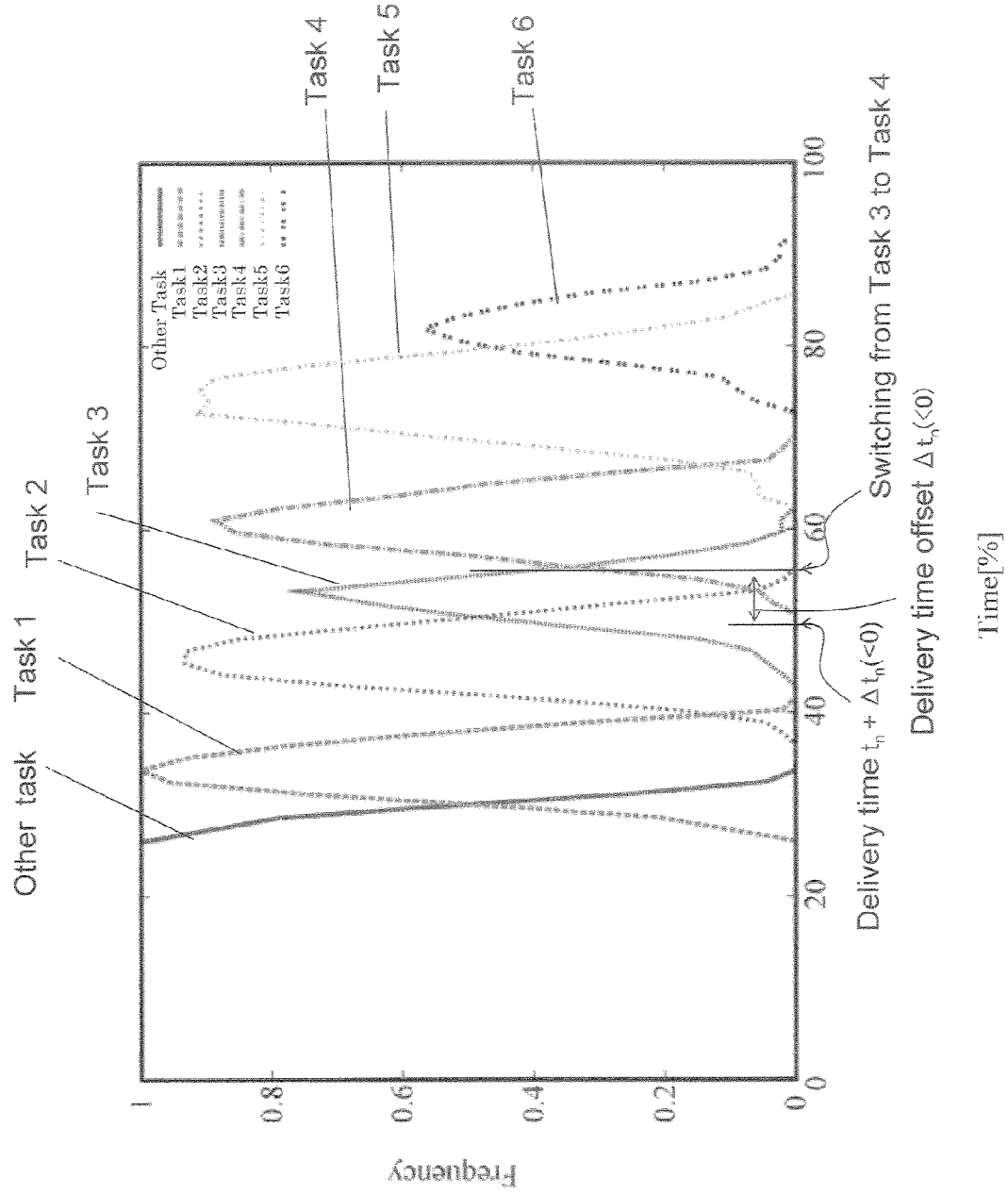
FIG. 11 is a chart illustrating the function of the delivery timing determining unit and the delivery time adjustment unit.

FIG. 11 is a chart illustrating the function of the delivery timing determining unit 47 and the delivery time adjustment unit 49C. In FIG. 11, the horizontal axis represents time, whereas the vertical axis represents frequency. From the time obtained with the tact time standardized as 100% as shown in FIG. 11, on which task the worker is working can be found. If the time having statistically highest probability of work switching is regarded as the delivery timing $t_n$ as it is, there may be a case in which delivery is delayed. To prevent the problem, the delivery timing $t_n$ is computed by adding delivery time offset $\Delta t_n$, which is a given adjustment time, to that time. The delivery time offset $\Delta t_n$ must take a negative value without fail. If the offset is set to allow the actual delivery time to be slightly earlier than the time at which the worker actually starts the task, the offset can be arbitrarily set depending on the preference of the worker. It is possible that the time when the work is performed even once is set as the delivery timing. However, if the worker executes the task earlier than the expected time for some reasons even once, the delivery timing is determined by that data only, which is not preferable. Meanwhile, the delivery time offset $\Delta t_n$ (<0) can be added to the time having the highest work execution probability with respect to time to obtain the delivery timing.

The third computation unit 45C computes the probability distribution of the "execution probabilities of work with respect to position" and stores the data obtained. This probability distribution can be computed as follows. On the automobile coordinate system divided by the mesh of constant width, the frequency of each cell at which the worker is measured is divided by the total number of data in the relevant cell. The probability at which the worker is engaged in each procedure at the relevant position, namely the execution probability $R_{n,\,i,\,j}$ of work with respect to position, can be computed. When the worker's position (i, j) is given, $R_{n,\,i,\,j}$ indicates in which procedure the worker is engaged at the highest probability, and is given by equation (3) shown below.
[Equation 3]

$$R_{n,i,j} = \frac{1}{M} \sum_{m=1}^{M} \left( \frac{B_{m,n,i,j}}{\sum_{l=1}^{L} B_{m,n,i,j}} \right) \quad (3)$$

where, $B_{m,\,n,\,i,\,j}$ is the number of data points measured at the position (i, j) for the 1-th automobile, L is the number of automobiles on which the worker worked at that position, and n is the procedure number.

Figure 12:
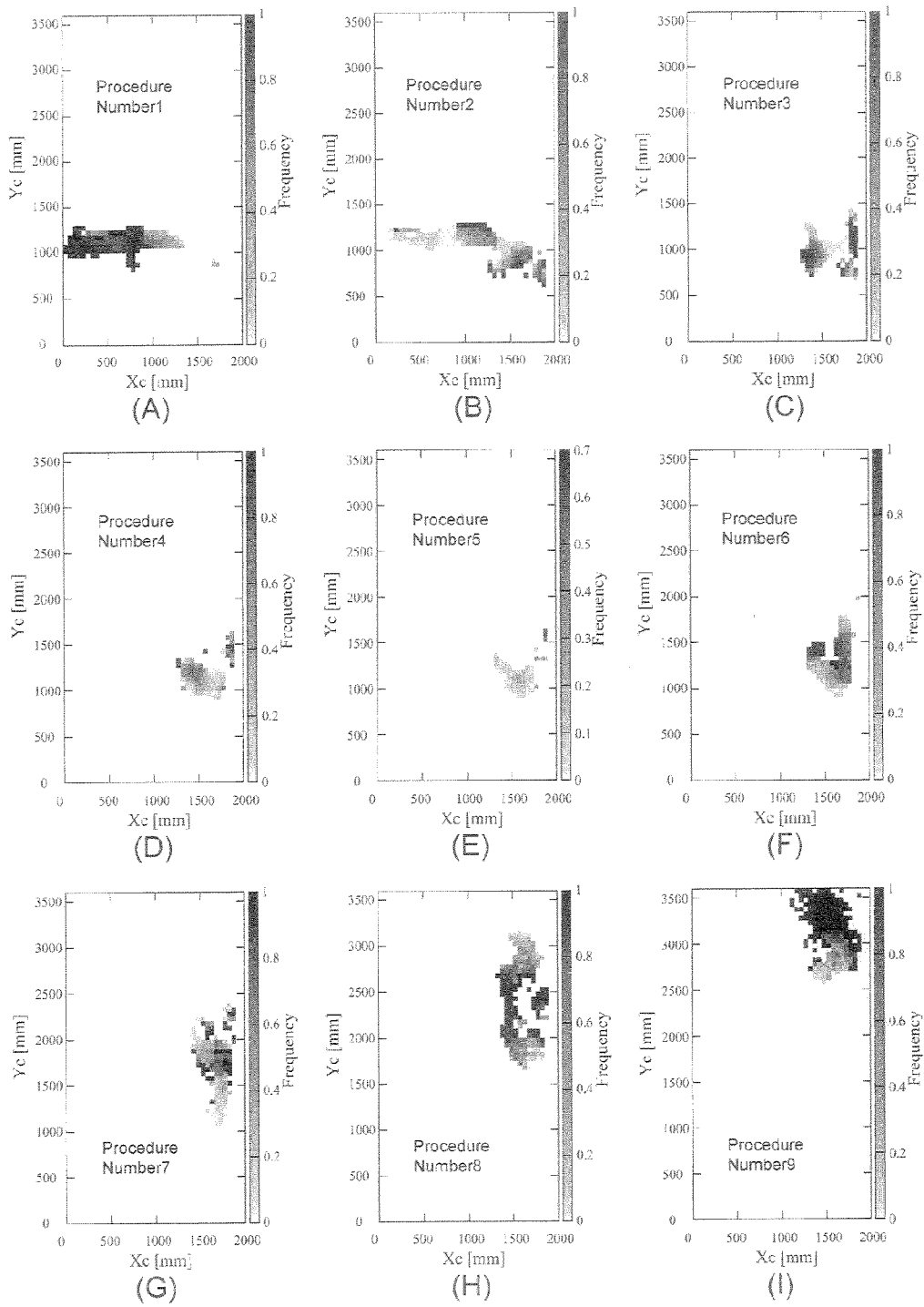
FIG. 12 graphically illustrates the execution probabilities of the work with respect to position, with (A) to (I) exhibiting the execution probabilities of each process with respect to position.
Figure 13:
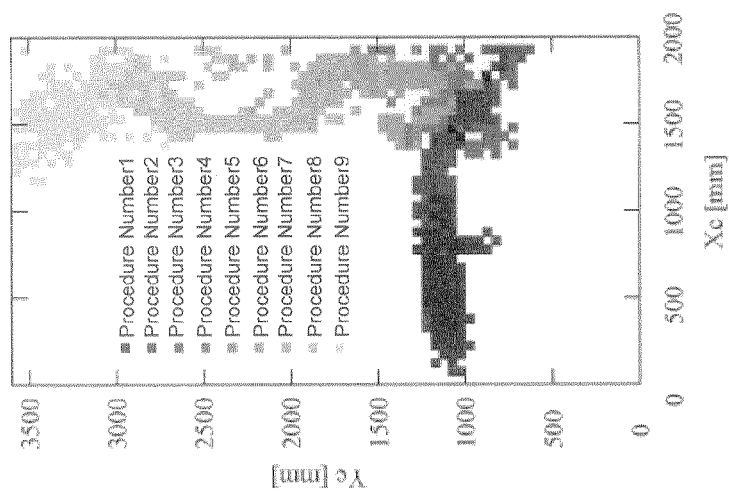
FIG. 13 graphically illustrates the execution probabilities of the work with respect to position shown in FIG. 12, with the work having the highest execution probabilities with respect to position shown on the automobile coordinate system Xc and Yc.

FIG. 12 graphically illustrates the execution probabilities of the work with respect to position, with (A) to (I) exhibiting the execution probabilities of each procedure with respect to position. The vertical and horizontal axes of each chart represent Xc and Yc in the automobile coordinate system. The shading exhibits frequency. FIG. 13 graphically illustrates the execution probabilities of the work with respect to position shown in FIG. 12, with the procedure having the highest execution probabilities with respect to position shown on the automobile coordinate system Xc and Yc. From FIG. 12, the procedure having the highest probability of being performed at each position can be computed statistically.

The work progress estimation unit 44 estimates the procedure currently performed from the execution probability of the work with respect to position input from the third computation unit 45C and the position of the worker input from the worker's position identifying unit 43, and computes the delivery time adjustment value. The work progress estimation unit 44 estimates the procedure having the highest probability of being performed by the worker at that time from the position of the worker measured in real time, and judges whether the worker advances to the next task before the delivery time or not. If the worker is found to have advanced to the next task before the delivery time, delivery time adjustment value is output so that the next tools and parts will be supplied immediately.

The real-time delivery time adjustment unit 49A computes the delivery time by adding the delivery timing computed by the delivery timing determining unit 47 and the time delivery adjustment value computed by the work progress estimation unit 44.

The delivery trajectory computation unit 48 computes the trajectory of the robot arm based on the delivery position determined by the delivery position determining unit 46. In detail, the delivery trajectory computation unit 48 computes the space trajectory based on the value obtained by adding the delivery position offset ($\Delta x_n$, $\Delta y_n$) to the delivery position ($x_n$, $y_n$) input from the delivery position determining unit 46, and the value set in advance regarding the position of delivering parts and tools to the robot arm.

The robot 41 computes the time trajectory of the end effector of the robot arm based on the space trajectory of the end effector of the robot arm determined by the delivery trajectory computation unit 48, the delivery time $T_n$ ($=t_n+\Delta t_n+\Delta t_u$) input from the real-time delivery time adjustment unit 49A via the delivery timing determining unit 47 and the delivery time adjustment unit 49C, and the value set in advance regarding the timing of delivering parts and tools to the robot arm, and controls the robot arm accordingly.

If the target of control is not a robot arm but a delivery means, the delivery trajectory computation unit 48 computes the trajectory of the delivery means based on the delivery position determined by the delivery position determining unit 46. In detail, the delivery trajectory computation unit 48 computes the space trajectory of the end effector of the delivery means based on the value obtained by adding the delivery position offset to the delivery position input from the delivery position determining unit 46, and the value set in advance regarding the position for supplying parts and tools to the delivery means. In this case, if the delivery positions of each work are aligned along a straight line, a linear-motion table having one degree of freedom can be used.

The robot 41 computes the time trajectory of the end effector of the delivery means based on the space trajectory of the effector of the delivery means determined by the delivery trajectory computation unit 48, the delivery time $T_n$ ($=t_n+\Delta t_n+\Delta t_u$) input from the real-time delivery time adjustment unit 49A via the delivery time determining unit 47 and delivery time adjustment unit 49C, and the value set in advance regarding the timing of delivering parts and tools to the delivery means, and controls the delivery means accordingly.

Figure 8:
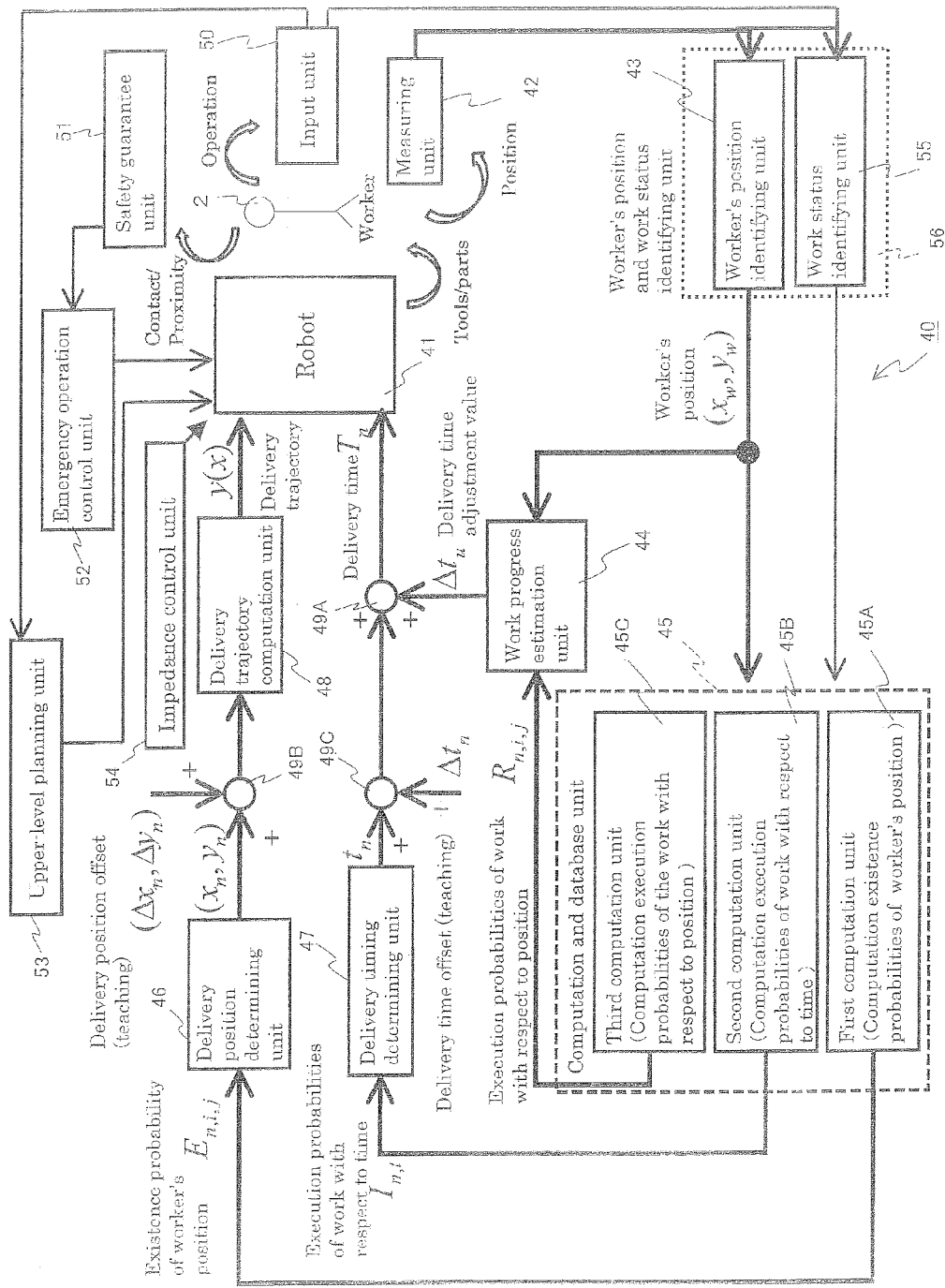
FIG. 8 is a block diagram of a variation of the working support robot system shown in FIG. 7.

As part of the input unit 50 shown in FIGS. 7 and 8, an input button, such as micro switch, to be used by the worker 2 to intentionally input the work status currently performed may be installed, and as the measuring unit 42 shown in FIG. 8, various sensors can be installed in the parts tray and the tool holder at the tip of the robot arm. The sensors that can be used include a micro switch and an infrared-ray sensor. If the information on the work status of the worker is input from the input unit 50 or measuring unit 42 thus configured to the work status identifying unit 55, of the work position and work status identifying unit 56, the work status identifying unit 55 identifies the work status, such as the work of which order is currently performed, based on the information input from the work status identifying unit 55. The work status identifying unit 55 stores the information based on the work procedure data required for identifying the work status. The work status identifying unit 55 inputs the identified work status to the second computation unit 45B, which then computes and updates the work execution probability with respect to time. The second computation unit 45B may not only compute the execution probability of work with respect to time by the method described above but also compute the execution probability of work with respect to time by various other methods, which will be described later.

The control procedure of the working support robot system 40 and 40A related to the second embodiment of the present invention will hereinafter be described. As the first step, the worker's position identifying unit 43 identifies the position of the worker based on the measurement data input from the range sensor of the measuring unit 42. The identification method is the same as that of the first embodiment.

As the second step, the computation and database unit 45 performs statistical processing of the position of the worker. As a result, three types of probability distributions, namely, the existence probability of the worker's position, $E_{n,\,i,\,j}$, the execution probability of the work with respect to time, $I_{n,\,t}$, and the execution probability of the work with respect to position $R_{n,\,i,\,j}$, are computed. In this case, the input unit 50 such as switching button, lever, or proximity sensor may be installed at the end effector of the robot arm, for example (see FIGS. 7 and 8), and the worker 2 performs simple input to the input unit 50, indicating that he/she has completed the current task and will advance to the next one. According to this input, the probability distribution of the relevant task is updated regarding the existence probability of the worker's position, $E_{n,\,i,\,j}$, the execution probability of the work with respect to time, $I_{n,\,t}$, and the execution probability of the work with respect to position, $R_{n,\,i,\,j}$, and the first computation unit 45A, second computation unit 45B, and third computation unit 45C are allowed to output the data to the delivery position determining unit 46, delivery timing determining unit 47, and the work progress estimation unit 44. In other words, the worker 2 inputs the information "which number of the task is being performed at that time" using the input unit 50 such as switching button mounted to the tip of the robot arm shown in FIGS. 7 and 8.

The work progress currently performed by the worker 2 may be input not only by using the input unit 50 shown in FIG. 7, which is for the worker to input data intentionally, but also by using various sensors such as micro switch or infrared-ray sensor mounted to the parts tray or tool holder at the tip of the robot arm as the measuring unit 42 as shown in FIG. 8. Whether the worker has received necessary parts or tools, or returned them, may be detected using those sensors, and the result obtained may be used as the input for advancing to the next task. That is, with the working support robot system 40 and 40A related to the second embodiment of the present invention, the measuring unit 42 and the input unit 50 are equipped with sensors or input unit for identifying the work status of the worker, and the position of the worker $(X_w, Y_w)$ is input from the worker's position identifying unit 43, and the information on the work status of the worker is input either from the input unit 50 or the measuring unit 42, or from both, to the first computation unit 45A and the third computation unit 45C. Consequently, the first computation unit 45A computes and updates the existence probability of the worker's position, whereas the third computation unit 45C computes and updates the execution probability of the work with respect to position. Since the information on the work progress of the worker is input to the second computation unit 45B from either the input unit 50 or the measuring unit 42, or from both, the second computation unit 45B computes and updates the execution probability of the work with respect to time. Namely, the first, second, and third computation units 45A, 45B, and 45C are capable of updating each probability distribution stored. The second computation unit 45B outputs the execution probability of the work with respect to time $I_{n,\,t}$ to the delivery timing determining unit 47 at specified time intervals. The first computation unit 45A outputs the existence probability of the worker's position $E_{n,\,i,\,j}$ to the delivery position determining unit 46 depending on the position of the worker $(X_w, Y_w)$ at specified time intervals, or every time the position of the worker $(X_w, Y_w)$ is input from the worker's position identifying unit 43, for example. The third computation unit 45C outputs the execution probability of the work with respect to position $R_{n,\,i,\,j}$ to the work progress estimation unit 44 at specified time intervals depending on the position of the worker $(X_w, Y_w)$.

If the reliability of statistical data increases to sufficiently high level, and consequently the database in the computation and database unit 45 need not be updated continuously, the input from the worker to the input unit 50 need not be used. If the database in the computation and database unit 45 needs to be updated on rare occasions for training of workers and for other reasons, a person other than the worker himself/herself, such as process manager, may input the data indicating that the task switches to the next one to the input unit 50, while observing the work status.

As the third step, the delivery position determining unit 46 determines the delivery position of parts and tools based on the existence probability of the worker's position $E_{n,\,i,\,j}$ input from the first computation unit 45A. Meanwhile, the delivery timing determining unit 47 computes the delivery time of parts and tools based on the execution probability of the work with respect to time $I_{n,\,t}$ input from the second computation unit 45B.

As the fourth step, the progress status of the work is estimated based on the position of the worker $(x_w, y_w)$ measured in real time and the execution probability of the work with respect to position $R_{n,\,i,\,j}$ input from the third computation unit 45C, and the delivery time $t_n$ is modified depending on the progress of the work. In addition to the modification of delivery time based on the progress of the work judged from the execution probability of the work $R_{n,\,i,\,j}$, the delivery time may also be modified immediately, on detection of the input to the input unit 50 indicating that the worker will advance to the next task.

As the fifth step, the delivery trajectory computation unit 48 computes the space trajectory of the arm based on the delivery position of parts and tools, and outputs the result to the robot 41, and the robot 41 computes the time trajectory of the arm from the space trajectory and the delivery time, and outputs the time trajectory.

The design concept of the system in the second embodiment of the present invention is to statistically describes the relation between the position of the worker obtained from the sensor of the measuring unit 42 and the work progress performed at that time, updates the memory, and allows the computation and database unit 45 to generate working support operations. In details, the first concept is to accumulate the measurement result of the movement of the worker, to describe the relation between the movement of the worker and the work progress statistically, and to determine the delivery position of tools and parts. The second concept is to accumulate the measurement result of the movement of the worker, to describe the relation between the movement of the worker and the work progress statistically, and to determine the delivery timing of tools and parts based on the description. The third concept is to accumulate the measurement result of the movement of the worker, to describe the relation between the movement of the worker and the work progress statistically, and to modify the delivery time of tools and parts in real time based on the description and the worker's position measured in real time.

Consequently, in the second embodiment of the present invention, by statistically analyzing the chronological data of the position of the worker obtained, the time actually needed to perform the work and the route of movement of the worker can be assessed. Furthermore, by assessing the preference of the worker, the work progress can be processed statistically.

According to the working support robot system 40 and 40A related to the second embodiment of the present invention, parts and tools can be supplied smoothly in response to the movement of the worker, which enhances work efficiency.

The embodiments of the present invention are not limited to the system configurations described previously such as those shown in FIGS. 7 and 8. For example, the first computation unit 45A, second computation unit 45B, and third computation unit 45C may be configured individually as each computation and database unit. The first computation unit 45A, delivery position determining unit 46, delivery trajectory computation unit 48, and the parts required by them may constitute the system, or the second computation unit 45B, delivery timing determining unit 47, and the parts required by them may constitute the system. The system can thus be configured by selecting units as required, without being equipped with all the units shown in FIGS. 7 and 8.

What is claimed is:

1. A working support robot system, comprising:
    a delivery mechanism for delivering one or more objects that are necessary for tasks to be performed by a worker to the worker;
    a measuring unit having at least one sensor for measuring the position of the worker;
    a work progress estimation unit for estimating the work progress based on data input from the measuring unit with reference to data on work procedure, and for selecting objects necessary for the next task when the work is found to have advanced to the next procedure, based on the estimated work progress and said data on work procedure; and
    a motion planning unit for devising a plan for the motion of the delivery mechanism based on the work progress estimated by the work progress estimation unit and the objects selected by the work progress estimation unit, the delivery mechanism being controlled by said plan devised by the motion planning unit so as to deliver the selected objects to the worker.

2. The working support robot system according to claim 1, wherein said delivery mechanism includes a robot arm,
    wherein the motion planning unit includes an arm motion planning unit for devising a plan for the trajectory of the robot arm based on the work progress estimated by the work progress estimation unit and the objects selected by the work progress estimation unit, the robot arm being controlled by said plan devised by the arm motion planning unit so as to deliver the selected objects to the worker.

3. A working support robot system, comprising:
    a delivery mechanism for delivering one or more objects that are necessary for tasks to be performed by a worker to the worker;
    a measuring unit for measuring the position of the worker;
    a work progress estimation unit for estimating the work progress based on data input from the measuring unit with reference to data on work procedure, and for selecting objects necessary for the next task when the work is found to have advanced to the next procedure; and
    a motion planning unit for planning the motion of the delivery mechanism to control the delivery mechanism based on the work progress estimated by the work progress estimation unit and the selected objects,
    wherein the area in which the worker is to be deployed has been divided into segments,
    the data on the work procedure contains information for each task concerning in which segment area the task is performed, and
    the work progress estimation unit specifies the position of the worker based on the data input from the measuring unit and estimates the work progress by determining in which segment the worker exists.

4. A working support robot system, comprising:
    a delivery mechanism for delivering one or more objects that are necessary for tasks to be performed by a worker to the worker;
    a measuring unit for measuring the position of the worker;
    a work progress estimation unit for estimating the work progress based on data input from the measuring unit with reference to data on work procedure, and for selecting objects necessary for the next task when the work is found to have advanced to the next procedure; and
    a motion planning unit for planning the motion of the delivery mechanism to control the delivery mechanism based on the work progress estimated by the work progress estimation unit and the selected objects,
    wherein the area in which the worker is to be deployed has been divided into segments,
    the data on the work procedure contains related information on working time and working area for each task, in which segment area the task is performed, and
    the work progress estimation unit identifies the position of the worker based on the data input from the measuring unit and estimates the work progress based on which segment the worker exists in and on elapsed time since the start of the work.

5. A working support robot system, comprising:
    a delivery mechanism for delivering one or more objects that are necessary for tasks to be performed by a worker to the worker;
    a measuring unit for measuring the position of the worker;
    a work progress estimation unit for estimating the work progress based on data input from the measuring unit with reference to data on work procedure, and for selecting objects necessary for the next task when the work is found to have advanced to the next procedure; and
    a motion planning unit for planning the motion of the delivery mechanism to control the delivery mechanism based on the work progress estimated by the work progress estimation unit and the selected objects,
    wherein the work progress estimation unit selects either tools or parts, or both, as objects necessary for the next task, and
    wherein a parts tray and an attachment are mounted to an end effector of the delivery mechanism, the parts tray being for delivering the tools and/or parts selected by the work progress estimation unit, the attachment being capable of holding the tools selected by the work progress estimation unit.

6. The working support robot system according to any one of claims 1-4 and 5,
    wherein the measuring unit includes a plurality of range sensors, each of the plurality of range sensors being placed apart at top and bottom, and
    the work progress estimation unit performs clustering of data input from the plurality of range sensors and identifies the position of the worker based on clusters related to the waist and feet of the worker.

7. The working support robot system according to any one of claims 3, 4, and 5,
    wherein said delivery mechanism includes a robot arm,
    wherein the motion planning unit includes an arm motion planning unit for planning the trajectory of the robot arm to control the robot arm based on the work progress estimated by the work progress estimation unit and the selected objects.

8. The working support robot system according to any one of claims 1-4 and 5,
wherein said delivery mechanism includes at least one of a robot arm having one degree of freedom, a linear motion table, and a movable carrier travelling on a floor surface.

9. A working support robot system, comprising:
a measuring unit having sensors;
a work status identifying unit for identifying the work status of a worker based on data input from the measuring unit;
a computation and database unit capable of computing and holding probability distribution of execution probabilities of work with respect to time, and computing execution probabilities of work with respect to time, based on the work status input from the work status identifying unit; and
a delivery timing determining unit for determining the delivery timing based on the execution probabilities of work with respect to time computed by the computation and database unit.

10. The working support robot system according to claim 9, further comprising:
a worker's position identifying unit for identifying the position of the worker based on data input from the measuring unit;
another computation and database unit for computing and holding probability distribution of execution probabilities of work with respect to position, and computing execution probabilities of work with respect to position according to the worker's position input from the worker's position identifying unit;
a work progress estimation unit for estimating the progress of work based on the execution probabilities of work with respect to position input from the another computation and database unit and the worker's position input from the worker's position identifying unit, and computing the delivery time adjustment value; and
a real-time delivery time adjustment unit for computing delivery time based on delivery timing computed by the delivery timing determining unit and the delivery time adjustment value computed by the work progress estimation unit.

11. The working support robot system according to claim 10,
wherein a delivery time adjustment unit is installed between the delivery timing determining unit and the real-time delivery time adjustment unit, the delivery time adjustment unit adding/subtracting the offset for the delivery time to/from the delivery timing computed based on the execution probabilities of work with respect to time and outputted from the computation and database unit, and outputting the result to the real-time delivery time adjustment unit.

12. A working support robot system, comprising:
a measuring unit having sensors;
a worker's position identifying unit for identifying a worker's position based on data input from the measuring unit;
a computation and database unit for computing and holding the probability distribution of the existence probabilities of the worker's position, and for computing the existence probabilities of the worker's position based on the worker's position input from the worker's position identifying unit;
a delivery position determining unit for determining the delivery position based on the existence probabilities of the worker's position determined by the computation and database unit; and
a delivery trajectory computation unit for computing the trajectory of a delivery mechanism based on the delivery position determined by the delivery determining unit.

13. The working support robot system according to claim 12,
wherein a delivery position adjustment unit is installed between the delivery position determining unit and the delivery trajectory computation unit, the delivery position adjustment unit adding/subtracting the offset for the delivery position to/from the delivery position computed based on the existence probabilities of the worker's position and outputted from the computation and database unit, and outputting the result to the delivery trajectory computation unit.

* * * * *